United States Patent
Ikegaya et al.

(10) Patent No.: US 6,193,203 B1
(45) Date of Patent: Feb. 27, 2001

(54) SEAT SLIDING APPARATUS

(75) Inventors: Isao Ikegaya; Tadashi Matsumoto, both of Kosai (JP)

(73) Assignee: Fujikiko Kabushiki Kaisha, Tokyo (JP)

(*) Notice: Subject to any disclaimer, the term of this patent is extended or adjusted under 35 U.S.C. 154(b) by 0 days.

(21) Appl. No.: 09/243,256

(22) Filed: Feb. 3, 1999

(30) Foreign Application Priority Data

Feb. 10, 1998 (JP) .................................................. 10-028804
Sep. 30, 1998 (JP) .................................................. 10-278423

(51) Int. Cl.⁷ .................................................. F16M 13/00
(52) U.S. Cl. ............................................ 248/429; 248/430
(58) Field of Search .................................. 248/429, 430; 297/344.1, 344.11

(56) References Cited

U.S. PATENT DOCUMENTS 4,957,267 * 9/1990 Terai ..................................... 248/430
5,286,076 * 2/1994 DeVoss et al. ........................ 248/430
5,842,383 * 12/1998 Yamada et al. ....................... 248/429

* cited by examiner

*Primary Examiner*—Anita M. King
*Assistant Examiner*—Jerome DeLuca
(74) *Attorney, Agent, or Firm*—Kilpatrick Stockton

(57) ABSTRACT

A seat sliding apparatus, includes: a pair of right and left upper rails; a pair of lock plates mounted respectively to the pair of right and left upper rails in such a manner such that vicinities of base portions of the lock plates are pivoted via a shaft so that the lock plates are capable of swinging around the shaft; lock holes formed on a lower portion of a free end of the lock plates to engage with lock gear teeth formed on the pair of right and left lower rails; a lock spring biasing the lock plates to swing so that the lock holes are engaged with lock gear teeth, whereby a movement of the seat main body in a front-and-rear direction is prevented, and whereby the seat main body can be moved in the front-and-rear direction by releasing the engagement: and an operation lever mounted to the pair of lock plates so that the lock plates can be operated simultaneously by operating the operation lever. In the construction, the operation lever at an end of the opposite side to the belt anchor mounted side is provided with a phase angle absorption means.

9 Claims, 25 Drawing Sheets

SEAT SLIDING APPARATUS

BACKGROUND OF THE INVENTION

1. Field of the Invention

The present invention relates to a seat sliding apparatus for a vehicle seat in which a seat main body is capable of moving a front-and-rear direction, an more specifically relates to a structure for mounting an operation lever to a lock plate.

2. Description of Related Art

In such a kind of a seat sliding apparatus, a vicinity of a base portion of a lock plate is mounted to side surfaces of a pair of right and left upper rails fixed to a seat cushion side so that the lock plate can be pivoted about a shaft. The lock plate is set so as to be pivoted by an operation of an operation lever mounted to a front side of the lock plate.

When lock holes formed on a free end of the lock plate is engaged with lock gear teeth formed on a pair of right and left lower rails fixed to a car body, the seat main body is prevented from moving the front-and-rear direction of the seat main body, and the seat main body can be moved by releasing the engagement.

Previously, the operation lever of such seat sliding apparatus was provided to one lock plate, and it was connected with the other lock plate via a wire or a rod so that the right and left lock plates were linked. However, recently a loop-type operation lever, which is constituted so that one rod is formed into a substantially U shape and its both ends are directly fixed to the lock plates, has been adopted in order to reduce the number of parts and reduce the costs and improve operability.

However, such a kind of operation lever cannot be mounted in a state that the right and left rails are not located, namely, in the state that a seat cushion or the like is mounted to the seat sliding apparatus. For this reason, after the operation lever was mounted to the right and left rails, the seat cushion or the like should be mounted, so a characteristic of the mounting was deteriorated.

Therefore, a structure that the operation lever is inserted from the forward side so as to be capable of being mounted has been suggested in Japanese Patent Application Laid-Open No. 8-295164 (1996) and Japanese Patent Application Laid-Open No. 9-11780 (1997). However, there arises a problem that a structure of a lock lever for inserting and fixing the operation lever is complicated and thus the characteristic of the mounting is deteriorated.

In addition, since such an operation lever is rigid, when upper rails fall sideways at a time of a side-on collision, the operation lever is pried, and the lock lever is pivoted due to this prying so that the lock is possibly released.

Furthermore, since such an operation lever is provided in a forward-lower position of the seat cushion, there is a fear of the heels of a person in the seat kicking up the operation lever at the time of a back-on collision. For this reason, the operation lever is conventionally provided in an inner position of the seat cushion so that heels do not touch with the operation lever. As a result, there arises a problem that the operability is deteriorated.

SUMMARY OF THE INVENTION

The present invention has been achieved in order to solve the above problems.

It therefore is an object of the present invention to provide a seat sliding apparatus which is capable of simplifying a structure of mounting an operation lever to a lock plate and reducing the cost and eliminating an unstable state.

Another object of the present invention is to provide a seat sliding apparatus in which even when a stress is applied to an upper rail on a belt anchor mounted side, a lock condition of the seat is not released, in addition to a structure in which mounting an operation lever to a lock plate can be simplified and the cost can be reduced, and an unstable state can be eliminated.

To achieve the object, according to a first aspect of the present invention, there is provided a seat sliding apparatus, comprising: a pair of right and left upper rails to be slidably guided in a pair of right and left lower rails, the upper rails being to be provided with a seat main body; a pair of lock plates mounted respectively to the pair of right and left upper rails in such a manner such that vicinities of base portions of the lock plates are pivoted via a shaft so that the lock plates are capable of swinging around the shaft; lock holes formed on a lower portion of a free end of the lock plates to engage with lock gear teeth formed on the pair of right and left lower rails; a lock spring biasing the lock plates to swing so that the lock holes are engaged with lock gear teeth, whereby a movement of the seat main body in a front-and-rear direction is prevented, and whereby the seat main body can be moved in the front-and-rear direction by releasing the engagement; and an operation lever mounted to the pair of lock plates so that the lock plates can be operated simultaneously by operating the operation lever, wherein the operation lever is formed into a substantially U shape and each end of the operation lever is connected with the lock plate mounted to the upper rail on a belt anchor mounted side and with the other lock plate mounted to the other upper rail on an opposite side to the belt anchor mounted side; and the operation lever at an end of the opposite side to the belt anchor mounted side is provided with a phase angle absorption means.

According to the seat sliding apparatus of the first aspect, since the phase angle absorption means is provided at the end of both the ends of the operation lever on the opposite side to the belt anchor mounted side connected with the lock plates, when the upper rail on the belt anchor mounted side is slanted at the time of a collision or the like, the lock plates and the operation lever can move according to the upper rails. As a result, the operation lever is prevented from being pried, and lock releasing on the belt anchor mounted side can be prevented.

According to a second aspect of the present invention, as it depends from the first aspect, the lock plates have two operation lever mounting sections which are coaxially formed with mounting holes respectively; the ends of the operation lever made of a pipe member are inserted into the two mounting holes; a plate-shaped member made of a spring material, which is formed into a substantially bow shape viewed from the front, is inserted into the pipe of the operation lever in the longitudinal direction in a manner such that an elastic force is applied to the plate-shaped material; ends of the plate-shaped member are engaged with two holes arranged on the ends of the operation lever in the longitudinal direction; said one hole formed on the operation lever is a slit in the longitudinal direction; one portion of the plate-shaped member is projected outward; a fixing concave section, which is engaged with an engagement section of the operation lever mounting sections, is formed on one portion of the projected plate-shaped member; a mounting tapered section is formed on the plate-shaped member which is slanted to an insertion direction where the fixing concave section is inserted into the mounting hole; a clearance in an up-and-down direction is provided between the mounting holes of the lock plates and the ends of the operation lever; and the fixing concave section of the plate-shaped member projected from the operation lever is positioned so that its bottom section is in an outer side from an outer peripheral surface of the operation lever so that an elastic force is applied to the engagement sections of the operation lever mounting sections.

According to the seat sliding apparatus of the second aspect, the operation lever can be mounted to the lock plates only by inserting the ends of the operation lever into the two mounting holes of the lock plates, and the clearance in the up-and-down direction provided between the mounting holes of the lock plates and the ends of the operation lever functions as the phase angle absorption means. For these reasons, it is not necessary to provide a phase angle absorption mechanism separately, and thus the structure can be simplified and the mounting characteristic can be improved.

In addition, since the plate-shaped member mounted to the operation lever applies the elastic force to the engagement sections of the operation lever mounting sections, the operation lever is moved to one side of the mounting holes so as not to be unstable. As a result, noises due to the unstable state can be prevented and operation feeling can be improved.

According to a third aspect of the present invention, as it depends from the first aspect, the plate-shaped member on the opposite side to the belt anchor mounted side is formed so that its one end on which the fixing concave section is formed is projected to the lock side; and a notched concave section is provided on a portion of the end of the operation lever on the opposite side to the belt anchor mounted side corresponding to the projected section of the plate-shaped member.

According to the seat sliding apparatus of the third aspect, since the one end of the plate-shaped member on the opposite side to the belt anchor side is projected to the lock side and the notched concave section is provided on the end of the operation lever corresponding to the projected section, even if the upper rail on the belt anchor mounted side is slanted at the time of a collision, the notched concave section provided on the opposite side to the belt anchor side functions as the phase angle absorption means. As a result, the lock plate on the belt anchor mounted side and the operation lever can be slanted according to the upper rail, and since the operation lever is not deflected, the lock releasing of the lock plates can be prevented.

According to a fourth aspect of the present invention, as it depends from the second aspect, the fixing concave section on the side of insertion into the mounting holes is formed so as to intersect substantially perpendicularly to an axis of the operation lever; and the fixing concave section on the other side is slanted so that its open side becomes wider and a leaving tapered section is formed thereon.

According to the seat sliding apparatus of the fourth aspect, even if the operation lever is kicked by the heel of a person in the seat at the time of a back-on collision, when a not less than constant force is applied from the front side to the operation lever, the engagement sections of the lock plates are removed from the engaged fixing concave sections so that the operation lever is moved to the rear side. As a result, since a force directing to a lock releasing direction is not applied to the lock plates, inadvertent lock releasing can be prevented.

According to a fifth aspect of the present invention, as it depends from the second aspect, a returning tapered section, which is slanted downward, is formed on the plate-shaped member on a side opposite to the mounting tapered section across the fixing concave section.

According to the seat sliding apparatus of the fifth aspect even if the operation lever is pushed into the rear side of the seat, the fixing concave section is again engaged with the operation lever mounting section so that the apparatus can be returned to the original state.

According to a sixth aspect of the present invention, there is provided a seat sliding apparatus, comprising: a pair of right and left upper rails to be slidably guided in a pair of right and left lower rails, the upper rails being provided with a seat main body; a pair of lock plates mounted respectively to the pair of right and left upper rails in such a manner such that vicinities of base portions of the lock plates are pivoted via a shaft so that the lock plates are capable of swinging around the shaft; lock holes formed on a lower portion of a free end of the lock plates to engage with lock gear teeth formed on the pair of right and left lower rails; a lock spring biasing the lock plates to swing so that the lock holes are engaged with lock gear teeth, whereby a movement of the seat main body in a front-and-rear direction is prevented, and thereby the seat main body can be moved in the front-and-rear direction by releasing the engagement; and an operation lever mounted to the pair of lock plates so that the lock plates can be operated simultaneously by operating the operation lever, wherein the lock plates have two operation lever mounting sections which are coaxially formed with mounting holes respectively; the ends of the operation lever made of a pipe member are inserted into the two mounting holes; a plate-shaped member made of a spring material, which is formed into a substantially bow shape viewed from the front, is inserted into the pipe of the operation lever in the longitudinal direction in a manner such that an elastic force is applied to the plate-shaped material; ends of the plate-shaped member are engaged with two holes arranged on the ends of the operation lever in the longitudinal direction; said one hole formed on the operation lever is a slit in the longitudinal direction; one portion of the plate-shaped member is projected outward; a fixing concave section, which is engaged with an engagement section of the operation lever mounting sections, is formed on one portion of the projected plate-shaped member; and a mounting tapered section is formed on the plate-shaped member which is slanted to an insertion direction where the fixing concave section is inserted into the mounting hole.

In the seat sliding apparatus of the sixth aspect, the operation lever can be mounted to the lock plates only by inserting the ends of the operation lever into the two mounting holes of the lock plates. Moreover, since the plate-shaped member can be mounted to the operation lever only by inserting the plate-shaped member into the pipe of the operation lever, the structure of mounting the operation lever to the lock plates can be simplified, and the mounting characteristic can be improved.

According to a seventh aspect of the present invention, as it depends from the sixth aspect, the fixing concave section of the plate-shaped member projected from the operation lever is positioned so that its bottom section is in an outer side from an outer peripheral surface of the operation lever so that an elastic force is applied to the engagement sections of the operation lever mounting sections.

In addition to the sixth aspect, since the plate-shaped member mounted to the operation lever applies an elastic force to the engagement sections of the operation lever mounting sections, the operation lever is moved to one side of the mounting holes so as not to be unstable. As a result, occurrence of the noises due to the unstable state can be prevented, and operation feeling can be improved.

According to a eighth aspect of the present invention, as it depends from the sixth or seventh aspect, the fixing. concave section has a bottom section, a first side surface and a second side surface; the first side surface is slanted at a substantial right angle with the axis of the operation lever; and the second side surface is slanted in such a manner that the plate-shaped member can be easily ejected through the engagement section of the operation lever section.

According to the eighth aspect, even if the operation lever is kicked by a leg of the user of the seat according to a rearward bump, the fixing concave section is disengaged from the engagement section so that the operation lever is rearwardly moved. Depending to this action, undesirable disengagement of lock of the seat is avoided because the lock plate has not received any force to disengage the lock of the seat.

According to a ninth aspect of the present invention, as it depends from one aspect among the sixth to eighth aspects, the plate-shaped member is formed with a returning tapered section on a opposite side to the mounting tapered section of the fixing concave section; and the returning tapered section is slanted in a direction opposite to a slanting direction of the mounting tapered section.

According to the ninth aspect, even the operation lever is rearwardly moved, the fixing concave section is re-engaged with the engagement section by retracting the operation lever.

According to a tenth aspect of the present invention, as it depends from one aspect among the sixth to ninth aspects, another portion of the plate-shaped member is formed at the other end of the plate-shaped member other than said one portion of the plate-shaped member; the other portion of the plate-shaped member is projected from the operation lever through the other hole formed in the operation lever so that an elastic force is applied to the engagement sections of the operation lever mounting sections by the other portion.

According to the seat sliding apparatus of the tenth aspect, since the one portion of the plate-shaped member projected from the operation lever comes in contact with the inner surfaces of the mounting holes so as to apply an elastic force thereto, the operation lever is moved to one side of the mounting holes so as not to be unstable. As a result, the occurrence of the noises due to the unstable state can be prevented, and the operation feeling can be improved.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
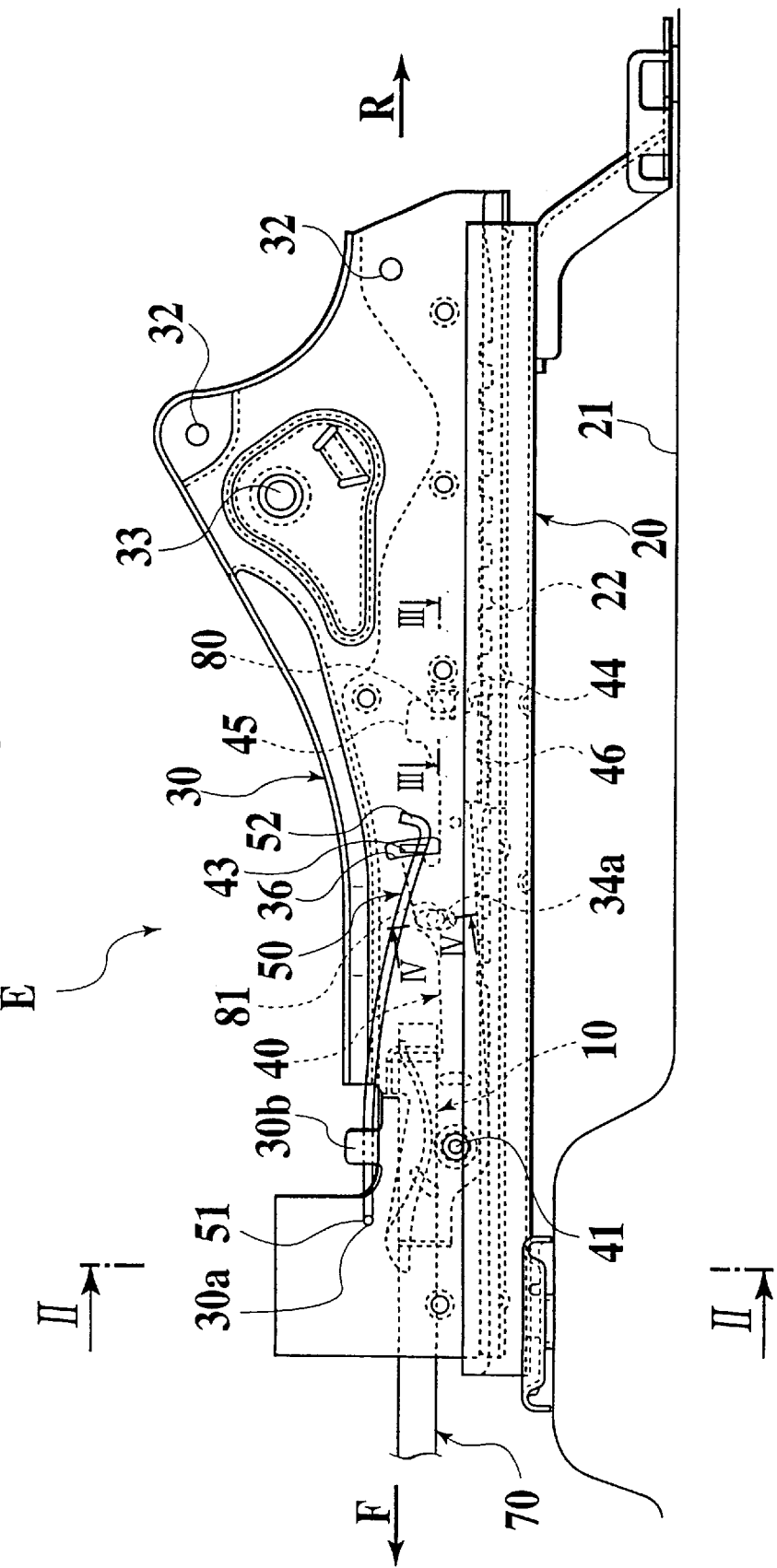
FIG. 1 is a front explanatory view showing a seat sliding apparatus according to an embodiment of the present invention which is locked.

There will be detailed below the preferred embodiments of the present invention with reference to the accompanying drawings. Like members are designated by like reference characters.

The following will describe an embodiment of the present invention with reference to FIGS. 1 through 15. In the drawings, E is a seat sliding apparatus of a vehicle seat. A vicinity of a base portion of a lock plate 40 is mounted to a side surface of an upper rail 30 so as to be capable of being pivoted about a shaft, and when lock holes 42 formed on a lower portion of a free end of the lock plate 40 are engaged with lock gear teeth 22 of a lower rail 20 by utilizing an urging force of a lock spring 50, a seat main body 60 is prevented from moving in a front-and-rear direction. When this engagement is released, the seat main body 60 can be moved in the front-and-rear direction, and the right and left lock plates 40 can be operated simultaneously by operating an operation lever 70 mounted to the lock plates 40.

Then, two operation lever mounting sections 47 and 48 having mounting holes 47a and 48a are formed coaxially on the lock plate 40, and ends of the operation lever 70 made of a pipe material are respectively inserted into the mounting holes 47a and 48a. A plate-shaped member 10, which is formed into a bow shape viewed from front and is made of a spring member, is inserted into the pipe of the operation lever 70 in the longitudinal direction with an elastic force being applied to the plate-shaped member 10 so that the ends of the plate-shaped member 10 are engaged respectively with two holes 71 and 72 formed on the ends of the operation lever 70 to be arranged in the longitudinal direction. The hole 72 formed on the operation lever 70 is a slit formed in the longitudinal direction, and one portion of the plate-shaped member 10 is projected therefrom, and a fixing concave section 14 with which an edge of the mounting hole 47a is engaged is formed on the one portion of the projected plate-shaped member 10. A mounting-use tapered section 15 of the lock plate 40, which is slanted to an insertion direction, is formed on the fixing concave section 14 on a side of insertion into the mounting hole 47a.

Further, the constitution according to the embodiment of the present invention will be described in detail.

Figure 11:
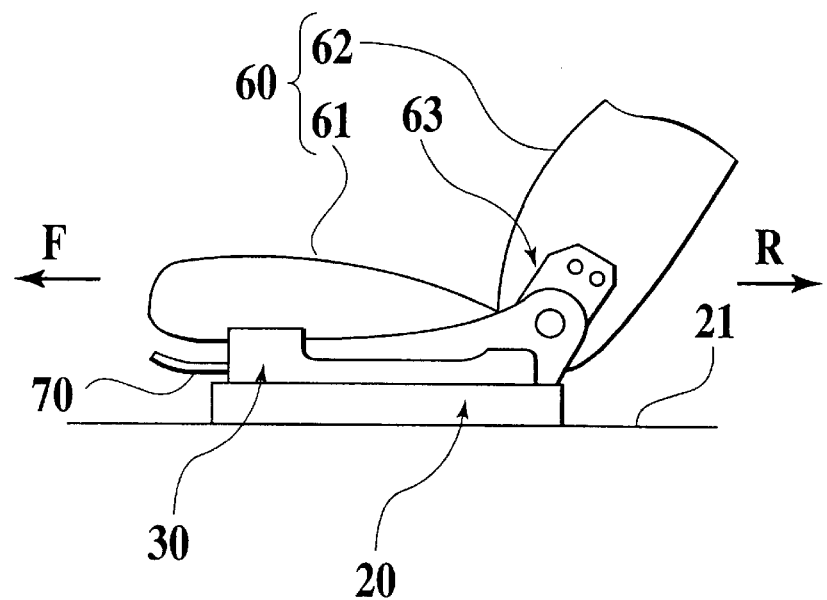
FIG. 11 is a front explanatory view showing an outline of a seat main body.
Figure 12:
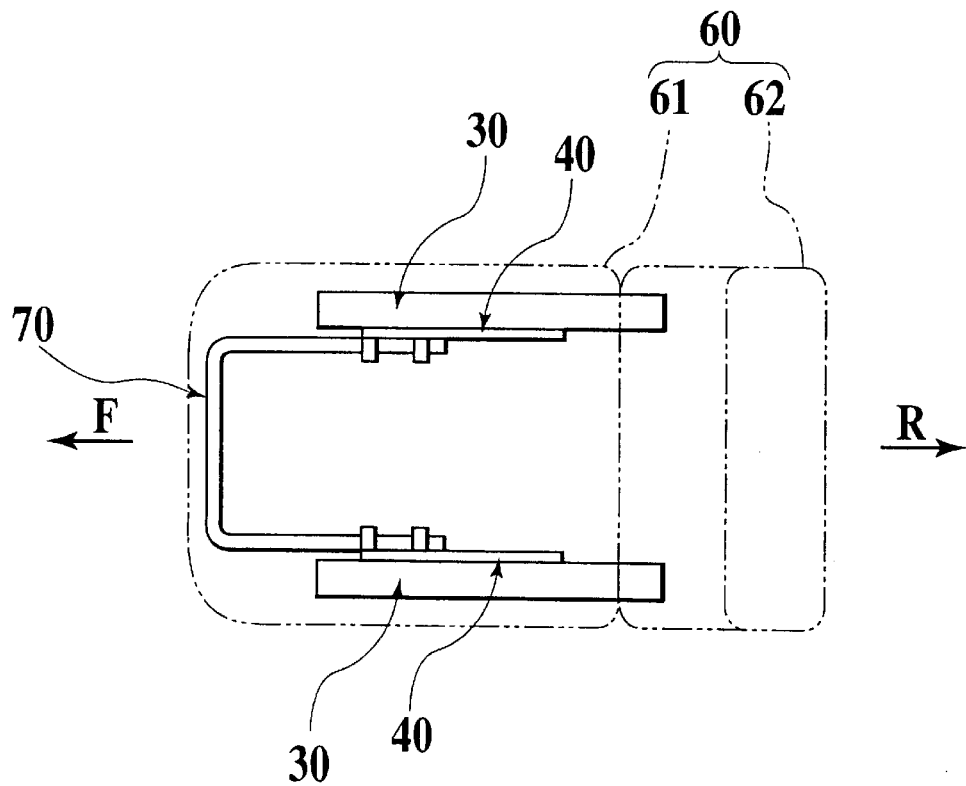
FIG. 12 is a plan explanatory view showing an outline of a mounting state of the operation lever to the lock plate.

As shown in FIGS. 11 and 12, the seat main body 60 has a seat cushion 61 and a seat back 62, and the seat back 62 is mounted to a rear portion of the seat cushion 61 via a shaft so as to be pivoted by a seat reclining device 63.

As shown in FIGS. 11 and 12, the lower rail 20 is mounted in right and left positions on a floor 21 of the car body along the front-and-rear direction at a predetermined interval.

Figure 2:
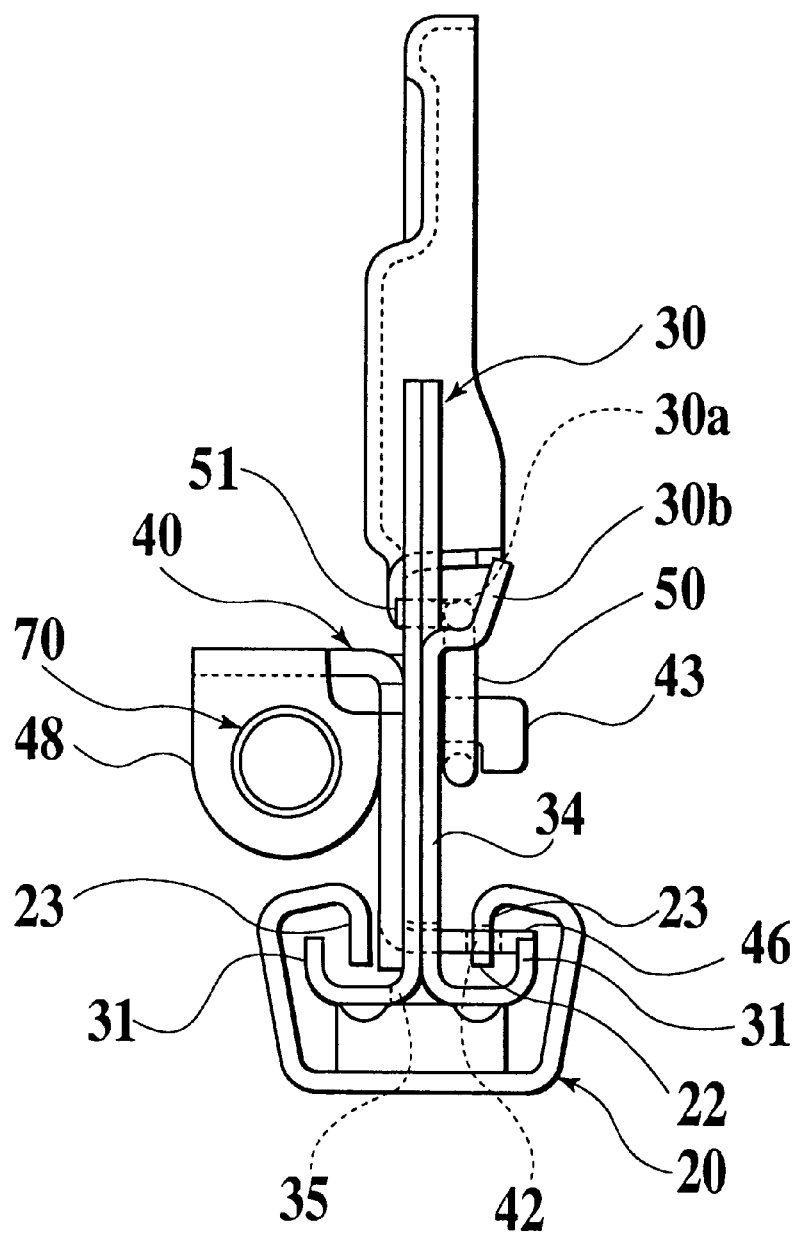
FIG. 2 is a fragmentary explanatory view taken along line II—II of FIG. 1.

In addition, as shown in FIG. 2, the lower rail 20 is formed into a substantially U shape, and engagement sections 23, which are bent to an inner direction, are formed on both sides of the lower rail 20. Moreover, the upper rail 30 is supported to the lower rail 20 so as to be capable of moving along the front-and-rear direction. The upper rail 30 is formed so that its section has a substantially T shape in such a manner that substantially L-shaped plates are overlapped with each other, and engagement sections 31 are formed on its both sides so as to direct upward. Further, the seat cushion 61 of the seat main body 60 is placed on the upper rail 30, and as a result the seat main body 60 can move in the front-and-rear direction. Here, as shown in FIG. 1, mounting holes 32 for mounting the seat reclining device 63 and a mounting section 33 for fixing an anchor of a seat belt are formed at the backward portion of the upper rail 30.

The one engagement section 23 of the lower rail 20 is disposed with plural lock gear teeth 22 along the front-and-rear direction at equal intervals. Moreover, the vicinity of the base portion of the lock plate 40 is mounted to the forward portion of a vertical wall section 34 of the upper rail 30 via a shaft 41 so as to be capable of being pivoted, and a lock section 46 having plural, i.e., two lock holes 42, which can be engaged with the lock gear teeth 22 of the lower rail 20, is formed at a free end of the lock plate 40. The lock section 46 of the lock plate 40 is projected from a notched section 35 formed on a lower-central side of the upper rail 30, and the lock holes 42 are engaged with the lock gear teeth 22.

Figure 4:
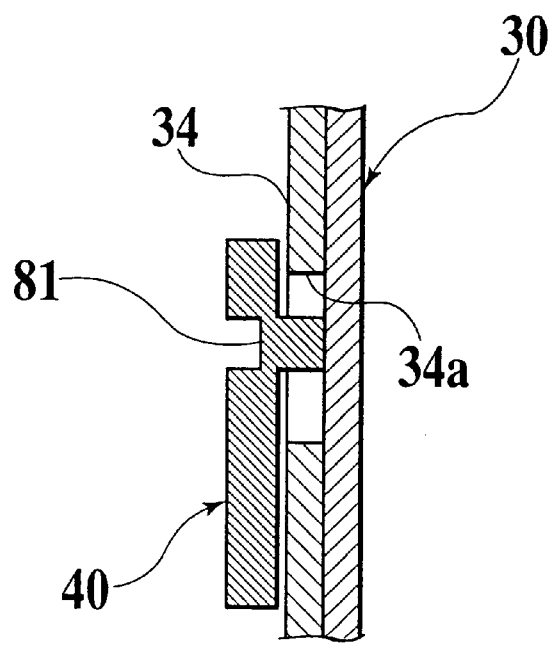
FIG. 4 is a fragmentary sectional view taken along line IV—IV of FIG. 1.
Figure 5:
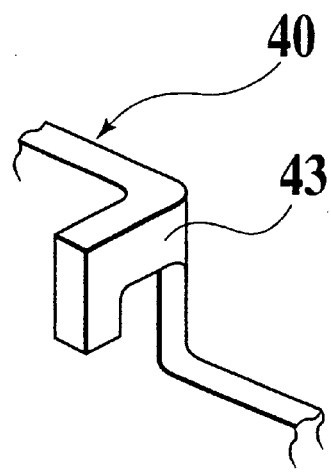
FIG. 5 is a perspective explanatory view showing a lock spring engagment section.

In addition, a lock spring engagement section 43, which is inserted into an arc-shaped lock plate guide slot 36 formed on the upper rail 30 about the shaft 41, is formed at the free end of the lock plate 40 so as to be bent as shown in FIG. 5. Moreover, an embossed projection 81 is formed on the lock plate 40, and as shown in FIG. 4, the projection 81 is engaged with a groove 34a formed on one vertical wall section 34 of the upper rail 30. This groove 34a regulates the operating range of the lock plate 40.

The lock spring 50 is formed into a rod shape, and its one end 51 is inserted into an engagement hole 30a formed on the upper rail 30 so as to be engaged therewith. Its vicinity is engaged with a hook section 30b formed on the upper rail 30 so that the lock spring 50 is not pivoted, and simultaneously a hook section 52 formed on the other end is engaged with the lock spring engagement section 43 formed on the lock plate 40. The lock spring 50 urges the lock plate 40 so that the lock plate 40 is pivoted about the shaft 41 in a counterclockwise direction in FIG. 1. Namely, the lock holes 42 of the lock plate 40 are always pressed against and engaged with the lock gear teeth 22 of the lower rail 20, and as a result the upper rail 30, i.e., the seat main body 60 is prevented from moving in the front-and-rear direction.

Figure 3:
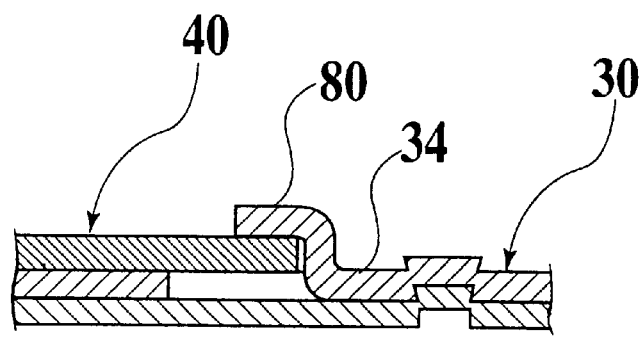
FIG. 3 is a fragmentary sectional view taken along line III—III of FIG. 1.
Figure 6:
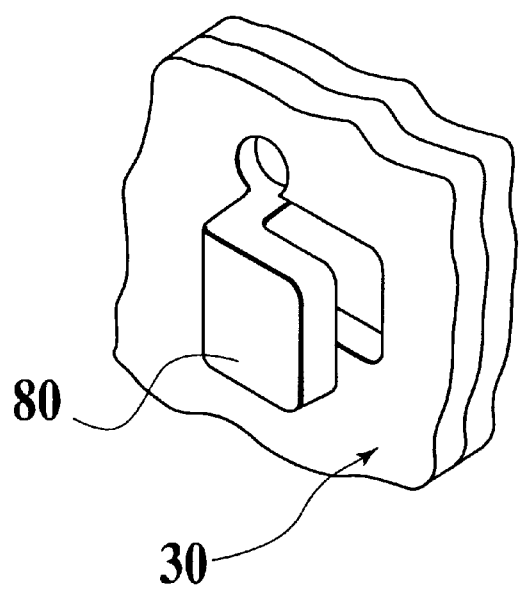
FIG. 6 is a perspective explanatory view showing a lock plate holding bent section.
Figure 7:
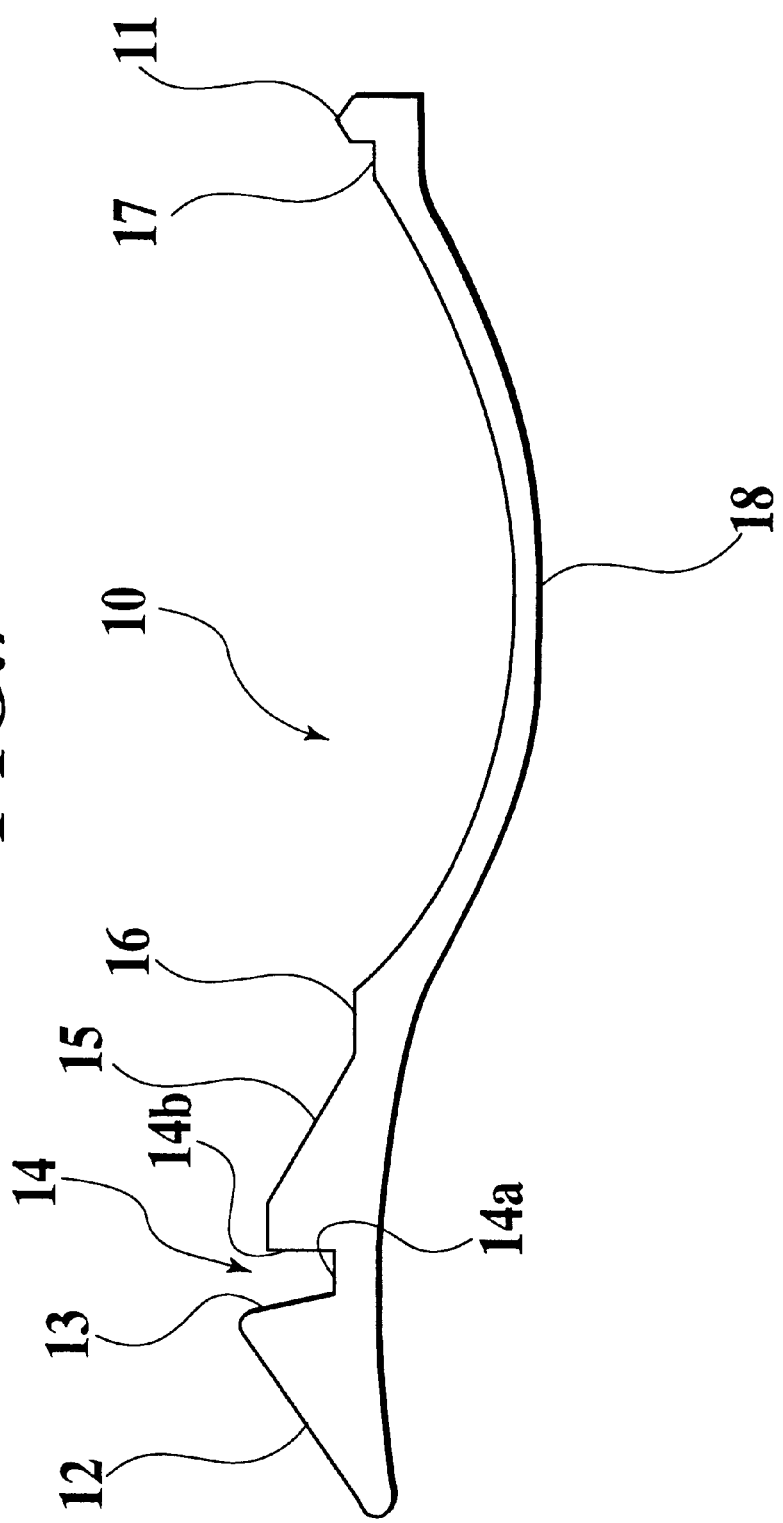
FIG. 7 is a front explanatory view showing a plate-shaped member.

A lock plate holding bent section 80 as lock plate holding means is formed in a position of the upper rail 30 corresponding to the free end of the lock plate 40 by cutting and raising the one vertical wall section 34 of the upper rail 30 and bending its forward end as shown in FIGS. 3 and 6. The free end of the lock plate 40 is held in the lock plate holding bent section 80 so as to be capable of sliding.

In addition, a notched section 44 through which the lock plate holding bent section 80 can pass is formed at the free end of the lock plate in a position corresponding to the lock plate holding bent section 80. As a result, the lock plate 40 is mounted to the upper rail 30 from the sidewise direction by matching the notched section 44 with the lock plate holding bent section 80.

In addition, while the lock holes 42 of the lock plate 40 are pressed against and engaged with the lock gear teeth 22 of the lower rail 20, the free end of the lock plate 40 is engaged with the lock plate holding bent section 80, and a guide projection 45 projected upward is formed on an upper portion of the free end of the lock plate 40. Even if the lock plate 40 is pivoted downward up to a position where the lock holes 42 of the lock plate 40 are released from the lock gear teeth 22 of the lower rail 20, this guide projection 45 prevents the free end of the lock plate 40 from coming off the lock plate holding bent section 80.

Further, operation lever mounting sections 47 and 48 for mounting the operation lever 70 are formed to be bent in the vicinity of the base portion of the lock plate 40 at a predetermined distance, and the mounting holes 47a and 48a are formed coaxially on the respective operation lever mounting sections 47 and 48. The ends of the operation lever 70 are inserted into the mounting holes 47a and 48a. Then, the edge portion of the mounting hole 47a of the one operation lever mounting section 47 composes an engagement section 49 which can be fitted into the fixing concave section 14 of the plate-shaped member 10.

The operation lever 70 is formed by a pipe member into a U shape, and the engagement hole 71 into which one end 11 of the plate-shaped member 10 can be fitted is formed at the forward end of the operation lever 70. Further, the slit 72 which is extended to a front side is formed on the operation lever 70 on an axis which passes on the center of the engagement hole 71 with a predetermined separation from the engagement hole 71, and a groove width of the slit 72 is smaller than a diameter of the engagement hole 71.

The plate-shaped member 10 is made of a thin plate spring material, and it is inserted into the operation lever 70 from its slit 72. An engagement convex section 11, which is fitted into and engaged with the engagement hole 71 of the operation lever 70, is formed at the end of the plate-shaped member 10 on the insertion side.

Figure 13:
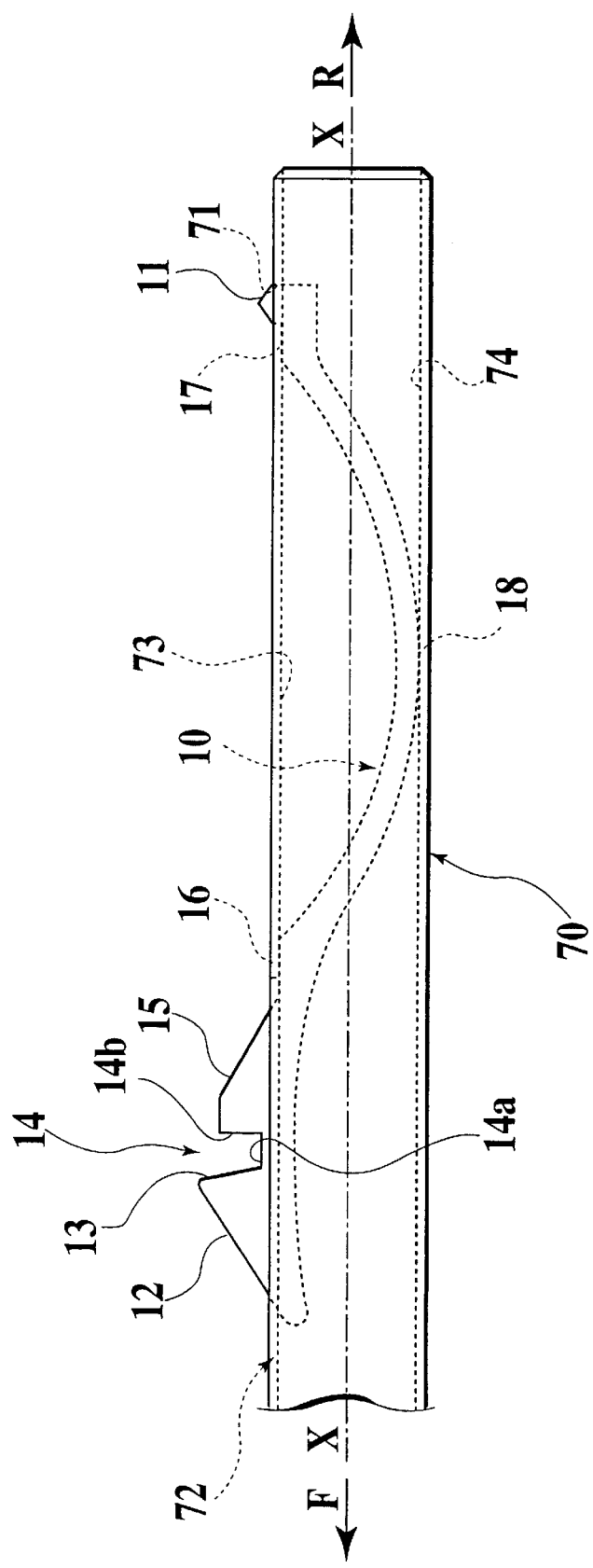
FIG. 13 is a front explanatory view showing a state that the plate-shaped member is mounted to the operation lever.

The mounting tapered section 15, the fixing concave section 14 and a returning tapered section 12 are formed at the other end of the plate-shaped member 10 successively from the direction of the insertion into the mounting hole 47a, and these sections are set so that when the plate-shaped member 10 is mounted to the operation lever 70, they are projected from the slit 72 outward as shown in FIG. 13.

Figure 14:
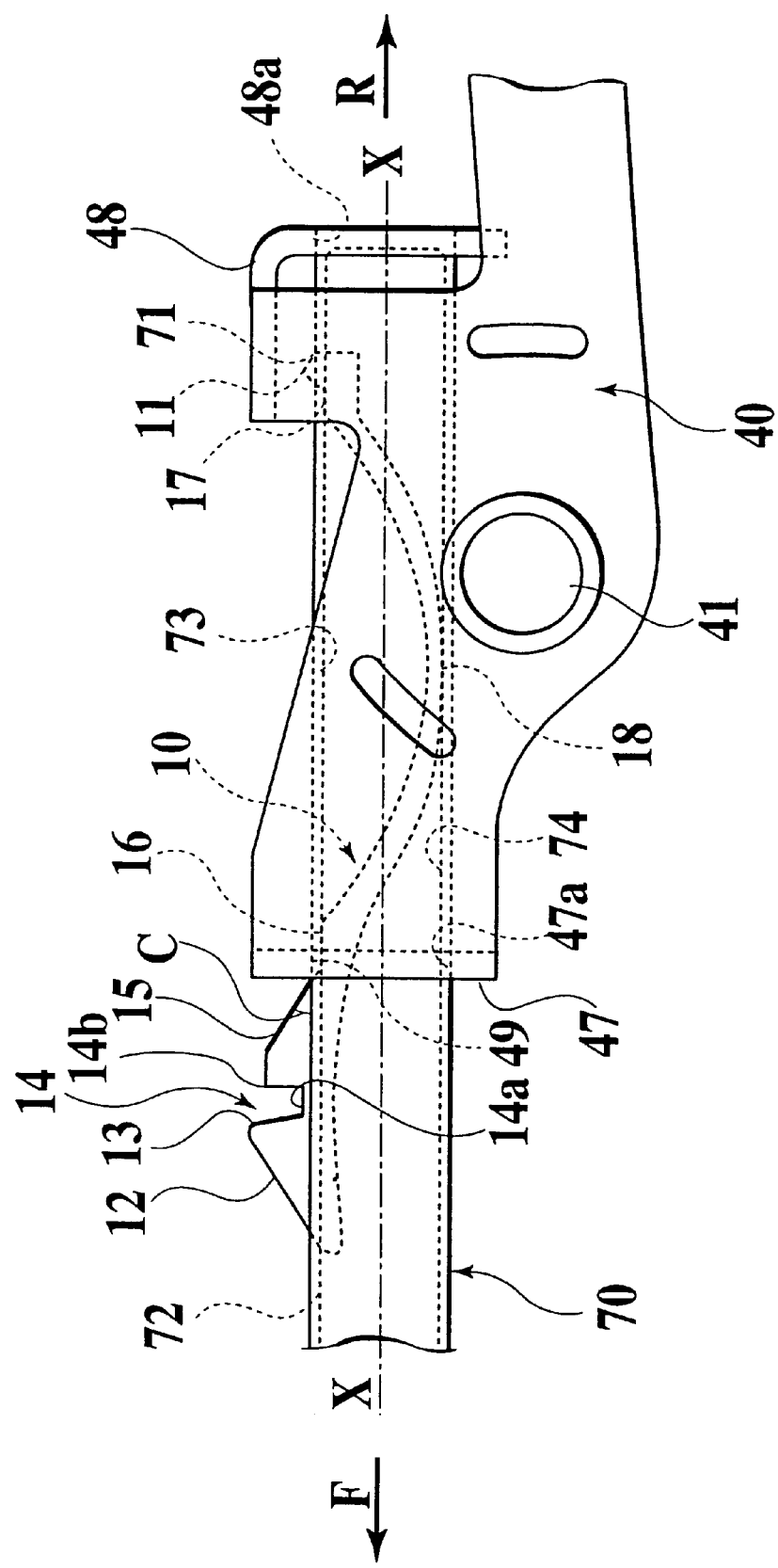
FIG. 14 is an explanatory drawing showing an operation of the plate-shaped member.

The mounting tapered section 15 is a slanted surface which is slanted downward, namely, towards a rear R side as shown in FIG. 14 with respect to an axis X—X of the operation lever 70 when the plate-shaped member 10 is mounted to the operation lever 70. When the operation lever 70 is inserted into the mounting hole 47a of the lock plate 40 at the time of mounting, the mounting tapered section 15 comes into contact with the edge portion of the mounting hole 47a and thus deflection occurs so that the insertion of the operation lever 70 into the mounting hole 47a is not hindered. 10 The fixing concave section 14 is formed so that the engagement section 49 of the lock plate 40 can be fitted therein to, and when a bottom section 14a of the fixing concave section 14 is projected from the slit 72, an elastic force is applied to the engagement section 49 so that the operation lever 70 is moved to one side of the mounting hole 47a.

In addition, a side surface 14b of the fixing concave section 14 on the side of the mounting tapered section 15 is formed so as to intersect substantially perpendicularly to the axis X—X of the operation lever 70 when the plate-shaped member 10 is mounted to the operation lever 70. When the operation lever 70 is pulled in the pulling-out direction, it does not easily come off. Moreover, the other side surface 13 of the fixing concave section 14 is disposed with a leaving taper section which is slanted so that its opening side becomes wide, and when a strong force directing to the insertion direction is applied to the operation lever 70, the engagement section 49 of the lock plate 40 is released from the fixing concave section 14 so that the operation lever 70 is inserted therein to and can be moved to the rear side.

In addition, the returning tapered section 12, which is slanted downward, is formed on the opposite side to the mounting tapered section 15 across the fixing concave section 14. Even if the operation lever 70 is inserted mistakenly, the plate-shaped member 10is deflectedby pulling out the operation lever 70, and the fixing concave section 14 can be again engaged with the engagement section 49 of the lock plate 40.

In addition, when the operation lever 70 is mounted to the regular position of the lock plate 40, namely, when the engagement section 49 of the lock plate 40 is fitted into the fixing concave section 14 of the plate-shaped member 10, the engagement hole 71 of the operation lever 70 overlaps with the operation lever mounting section 48 of the lock plate 40. Since the engagement convex section 11 of the plate-shaped member 10 which is projected from the engagement hole 71 comes in contact with the inner surface of the mounting hole 48a of the operation lever mounting section 48 so that an elastic force is applied, the operation lever 70 is moved to one side of the mounting hole 48a. The engagement convex section 11 is formed into an angular shape, but it may have an arc shape or a tapered shape.

The following will describe a function according to the embodiment of the present invention.

When the lock plate 40 is mounted to the upper rail 30, the notched section 44 of the lock plate 40 is first inserted into the lock plate holding bent section 80, and simultaneously the lock spring engagement section 43 is inserted into the lock plate guide slot 36. At this time, the lock section 46 of the lock plate 40 is projected from the notched section 35 of the upper rail 30 to the opposite side. Next, the base portion of the lock plate 40 is supported to the upper rail 30 by the shaft 41. As a result, the lock plate 40 can be mounted to the upper rail 30 via the shaft so as to be capable of being pivoted. Next, the upper rail 30 is mounted to the lower rail 20 via a roller, a ball or the like so as to be capable of sliding. As a result, even if the lock plate 40 is pivoted up to a position where the lock holes 42 of the lock plate 40 are engaged with the lock gear teeth 22 of the lower rail 20, the lock plate 40 is not pivoted up to a position where the notched section 44 coincides with the lock plate guide bent section 80.

Then, the one end 51 is inserted into the engagement hole 30a of the upper rail 30, and simultaneously the lock spring 50 whose vicinity is engaged with the hook section 30b is deflected, and the hook section 52 at the other end of the lock spring 50 is engaged with the lock spring engagement section 43 of the lock plate 40 which is projected from the lock plate guide slot 36 of the upper rail 30. As a result, the hook section 46 of the lock plate 40 is urged in the counterclockwise direction in the drawing, namely, in a direction where the lock holes 42 of the lock plate 40 are pressed against and engaged with the lock gear teeth 22 of the lower rail 20.

In order to mount the operation lever 70 to the lock plate 40, as shown in FIG. 13, the plate-shaped member 10 is deflected and inserted into the operation lever 70 from the slit 72, and the engagement convex section 11 is fitted into the engagement hole 71 of the operation lever 70 from the inside. At the same time, the upper surfaces 16 and 17 are pressingly brought into contact with an inner-upper surface 73 of the operation lever 70. At this time, an arc section 18 of the plate-shaped member 10 is pressingly brought into contact with an inner-lower surface 74 of the operation lever 70.

Figure 8:
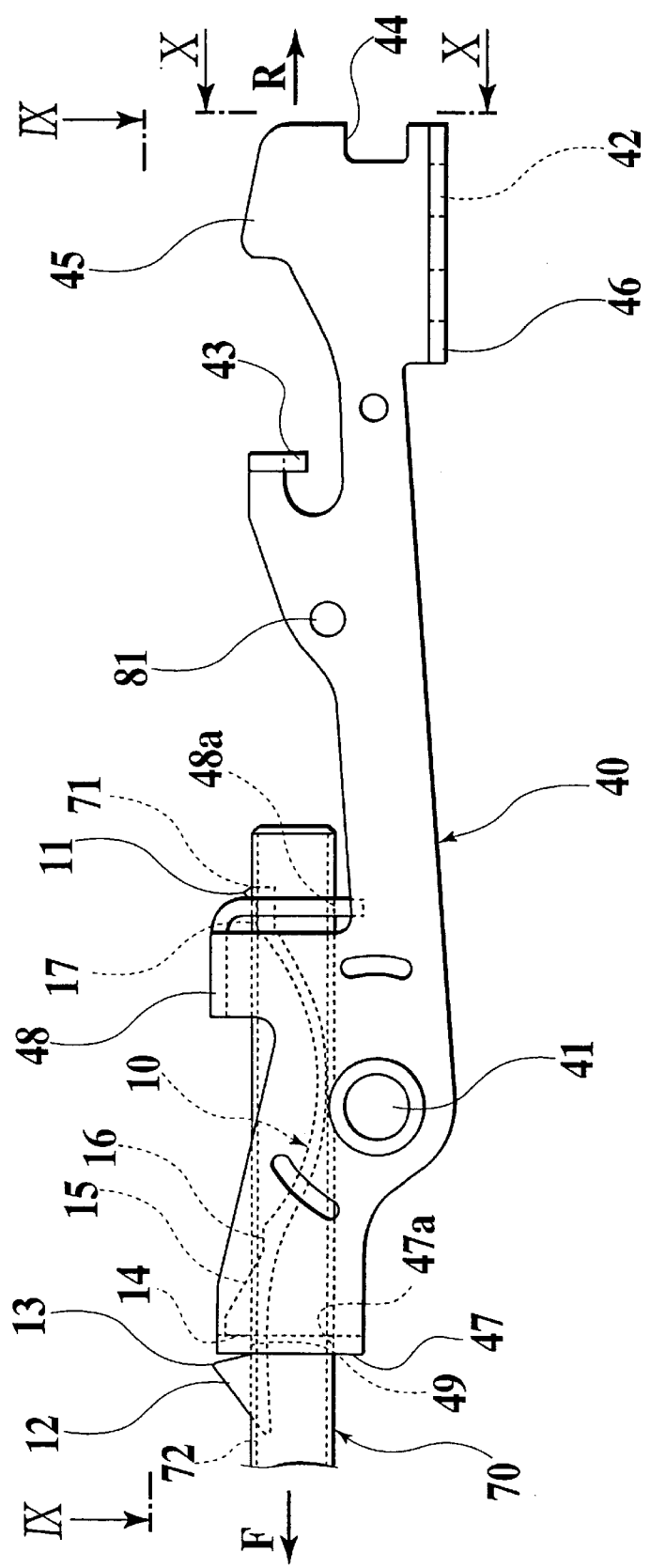
FIG. 8 is a front explanatory view showing a state that an operation lever is mounted to a lock plate via the plate-shaped member.
Figure 9:
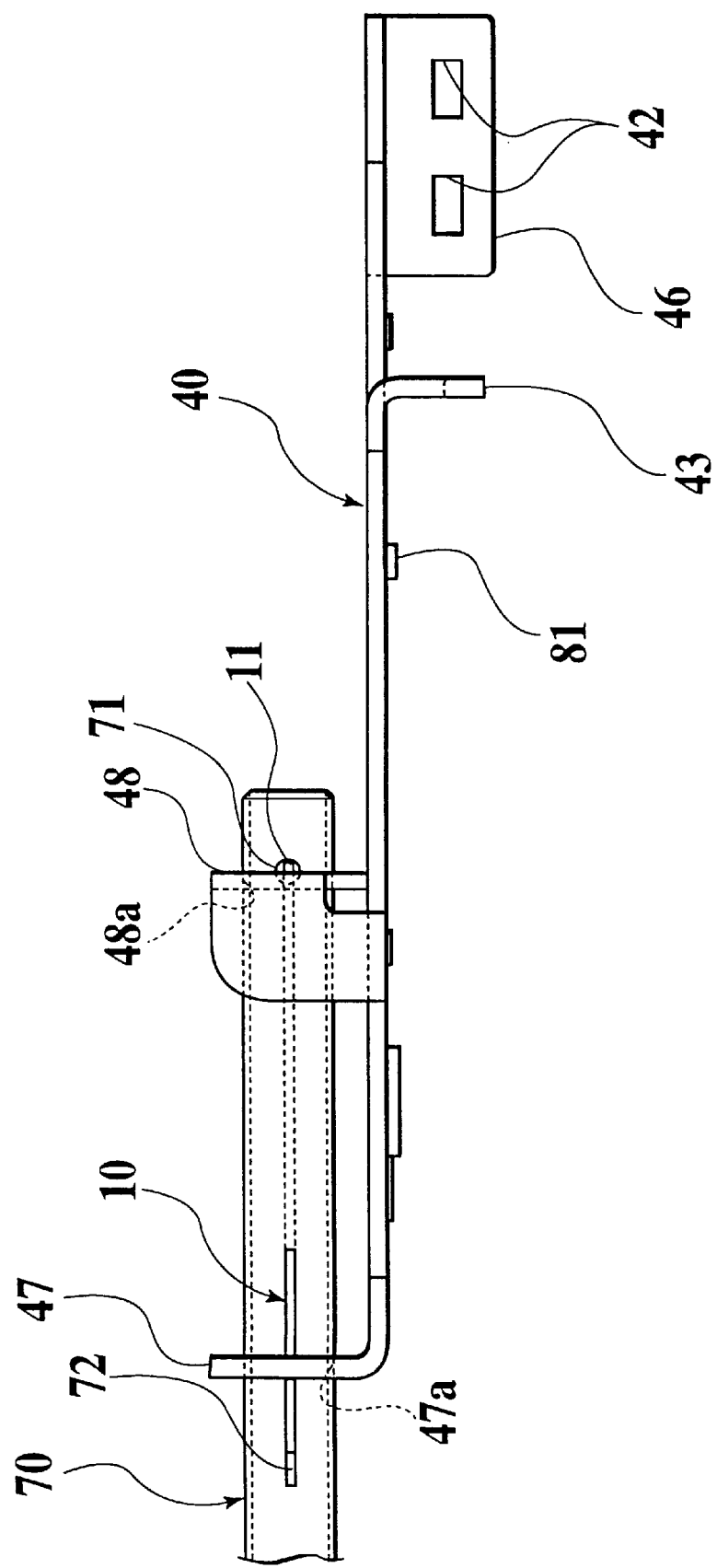
FIG. 9 is a fragmentary explanatory view taken along line IX—IX of FIG. 8.
Figure 10:
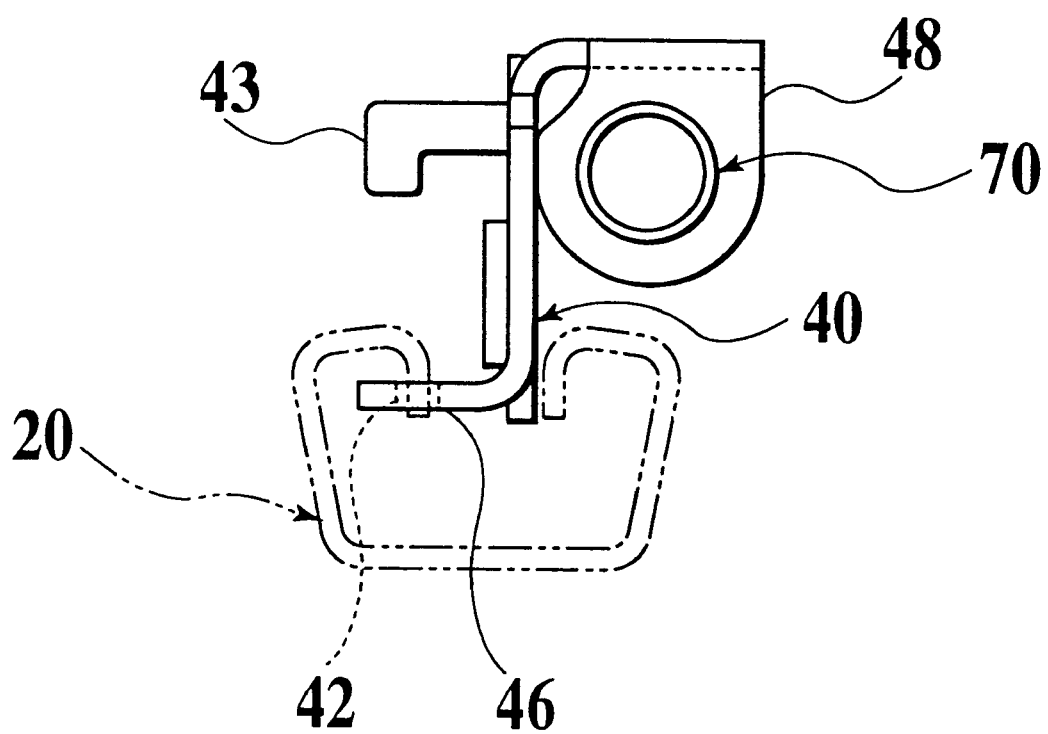
FIG. 10 is the view taken along line X—X of FIG. 8.

Next, as shown in FIG. 14, the end of the operation lever 70 to which the plate-shaped member 10 was mounted is inserted into the mounting hole 47a of the operation lever mounting section 47 of the lock plate 40. Then, the engagement section 49 of the lock plate 40 slides on the mounting tapered section 15, and the front F side of the plate-shaped member 10 is deflected about a contact portion between the arc section 18 and the inner surface 74 of the operation lever 70 so that the plate-shaped member 10 is temporarily evacuated in the slit 72. When the fixing concave section 14 reaches a position which faces the engagement section 49, the engagement section 49 is fitted into the fixing concave section 14 by the elastic force of the plate-shaped member 10. As a result, as shown in FIG. 8, the operation lever 70 can be mounted to the lock plate 40.

Then, when the operation lever 70 is pivoted upward, the lock plate 40 is pivoted about the shaft 41 in the clockwise direction, and the lock holes 42 leave from the lock gear teeth 22 of the lower rail 20 so that the seat main body 60 can be moved in the front-and-rear direction.

In addition, when a not less than constant force is applied to the operation lever 70 from the front F side, the leaving tapered section 13 slides on the engagement section 49 of the lock plate 40, and the plate-shaped member 10 on the front F side is evacuated in the slit 72 so that the operation lever 70 is moved to the rear R side.

Figure 15:
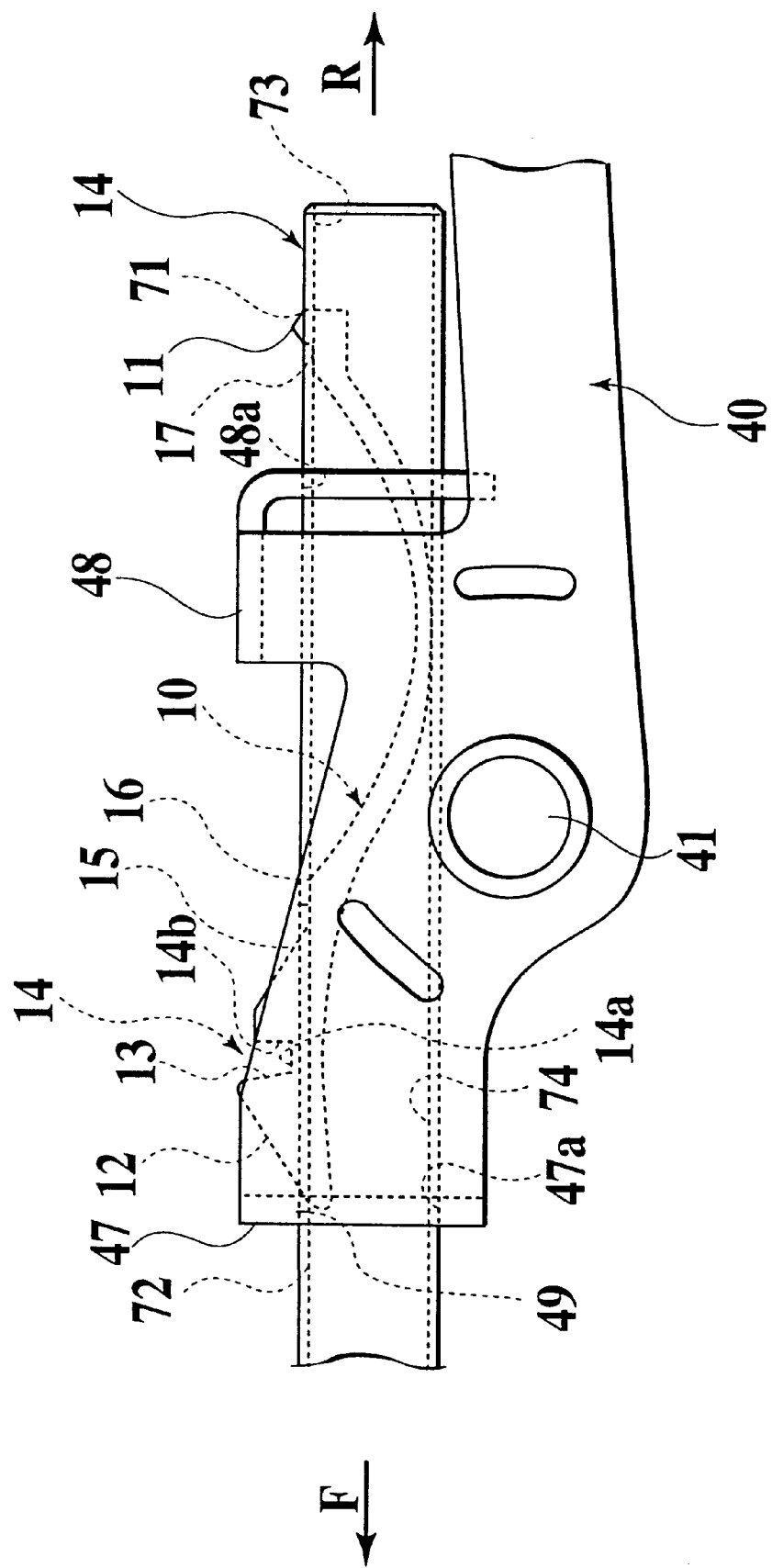
FIG. 15 is an explanatory drawing showing an operation of the plate-shaped member.

Then, when an abnormal force is applied to the operation lever 70 from the front F side and the operation lever 70 exceeds the regular mounting position so as to enter the lock plate 40 as shown in FIG. 15, the operation lever 70 is pulled back so as to be moved to the front F side. As a result, the returning tapered section 12 slides on the engagement section 49 of the lock plate 40, and the plate-shaped member 10 on the front F side is temporarily evacuated in the slit 72. When the fixing concave section 14 reaches the position which face the engagement section 49, the engagement section 49 is fitted into the fixing concave section 14 by the elastic force of the plate-shaped member 10. As a result, the operation lever 70 can be returned to the regular mounting position.

As mentioned above, according to the embodiment of the present invention, since the plate-shaped member 10 can be mounted to the operation lever 70 by inserting the engagement convex section 11 into the engagement hole 71 from the inside through the slit 72 of the operation lever 70 so as to be fitted therein to, the structure of mounting the operation lever 70 to the lock plate 40 can be simplified.

In addition, the operation for mounting the operation lever 70 to the lock plate 40 can be further simplified by co-operation of the mounting tapered section 15 of the plate-shaped member 10 and the engagement section 49 of the lock plate 40.

In addition, since the fixing concave section 14 of the plate-shaped member 10 is formed so that the engagement section 49 of the lock plate 40 can be fitted therein to, the operation lever 70 can be accurately located on the lock plate 40.

In addition, when a not less than constant force is applied from the front side to the operation lever 70 by the leaving tapered section 13 formed on the plate-shaped member 10, the operation lever 70 is moved to the rear R side. As a result, since a force directing to the lock releasing direction is not applied to the lock plate 40, inadvertent lock release can be prevented.

In addition, even if an abnormal situation arises, i.e., the operation lever 70 exceeds the regular mounting position and is mounted to the lock plate 40, the operation lever 70 can be returned to the regular mounting position by the returning tapered section 12 formed on the plate-shaped member 10.

Furthermore, since the operation lever 70 can be mounted to the lock plate 40 stably by the plate-shaped member 10 which is formed into a bow shape and to which an elastic force is applied, occurrence of noises can be prevented and simultaneously operation feeling can be improved.

Further, the engagement of the fixing concave section 14 of the plate-shaped member 10 with the engagement section 49 of the lock plate 40 regulates the axial movement of the operation lever 70 and does not regulate the rotating direction, and the operation lever 70 has a circular section. As a result, even if the vertical wall section 34 of the upper rail 30 falls at the time of a side-on collision, the operation lever 70 is not pried, and the pivoting of the lock plate 40 in the lock releasing direction due to this prying can be prevented. For this reason, inadvertent lock release can be prevented.

However, in the above-mentioned embodiment, since both the ends of the operation lever are fixed to respective lock levers, when a stress is applied to the upper rail on the belt anchor mounted side due to a collision or the like, the lock plate on the belt anchor mounted side as well as the upper rail on the belt anchor mounted side is pulled upward, and accordingly the floor of the car body is also deformed.

As a result, the upper rail and the lower rail on the belt anchor mounted side are slanted because their rear ends rise. Here, since a force is not applied to the upper rail on the other side in the rising direction, it is not slanted, and since the lock plates, which are supported to the upper rail on both the sides via the shafts, are connected by the U-shaped operation lever, even if the upper rail on the belt anchor mounted side is slanted, the lock plate on the same side is held in the original state. Namely, the belt anchor mounted side is in the same state as that the lock plate is pivoted with respect to the lower rail in the lock releasing direction.

Here, at this time of the collision, since a force in the front side is exerted, the lock holes of the lock plate are firmly engaged with the lock gear teeth of the lower rail, and the lock is not released and the operation lever is deflected so as to be deformed elastically.

Then, when the force which is exerted in the front direction fails after the collision, the lock plate on the belt anchor mounted side is pivoted by the deflection of the operation lever, and as a result the engagement of the lock holes with the lock gear teeth is occasionally released so that the lock is released.

The following will describe an embodiment of the present invention improved from the viewpoint of the above circumstances with reference to FIGS. 16 through 30.

In the drawings, E is a seat sliding apparatus of a vehicle seat. Vicinities of base portions of lock plates 40A and 40B are mounted respectively to side surfaces of a pair of right and left upper rails, i.e., an upper rail 30A on the belt anchor mounted side and an upper rail 30B on the other side via shafts so as to be capable of being pivoted. Further, the lock holes 42 formed on a lower portion of the free ends are engaged with the lock gear teeth 22 of the paired right and left lower rail 20 by utilizing an urging force of the lock spring 50 so that the seat main body 60 is prevented from moving to the front-and-rear direction, and the engagement is released so that the seat main body 60 can be moved in the front-and-rear direction. The lock plates 40A and 40B can be operated by operating the operation lever 70 mounted to the lock plates 40A and 40B.

Then, both the ends of the substantially U-shaped operation lever 70 are connected respectively to the lock plates 40A and 40B which are arranged on the upper rail 30A on the belt anchor mounted side and the upper rail 30B on the other side, and phase angle absorption means 75 is provided at an end 70b of the operation lever 70 on opposite side to the belt anchor mounted side.

In addition, two operation lever mounting sections 47 and 48 having the mounting holes 47a and 48a are respectively formed coaxially on the lock plates 40A and 40B, and the ends of the operation lever 70 made of a pipe member are inserted into the mounting holes 47a and 48a. A plate-shaped member 10A on the belt anchor mounted side, which is formed by a spring member into a substantially bow shape viewed from the front, is inserted into the pipe of the operation lever 70 on the belt anchor mounted side in the longitudinal direction with an elastic force being applied thereto, and the ends of the plate-shaped member 10A are engaged respectively with the two holes 71 and 72 which are arranged in the longitudinal direction of the end 70a of the operation lever 70 on the belt anchor mounted side. The hole 72 formed on the operation lever 70 is a slit formed in the longitudinal direction, and one portion of the plate-shaped member 10A is projected outward. The fixing concave section 14, which is engaged with the edge portion of the mounting hole 47a as an engagement section of the operation lever mounting section 47, is formed on the one projected portion of the plate-shaped member 10A, and the mounting tapered section 15 of the lock plate 40A, which is slanted in the insertion direction, is formed on the fixing concave section 14 on the insertion side.

In addition, the other plate-shaped member, i.e., a plate-shaped member 10B on the opposite side to the belt anchor mounted side, is inverted 180° with respect to the plate-shaped member 10A on the belt anchor mounted side to be mounted, and its one end is projected outward. Similarly to the plate-shaped member 10A, the plate-shaped member 10B is provided on the end 70b of the operation lever 70 on the opposite side to the belt anchor mounted side, and a notched section 75 as the phase angle absorption means is provided on a portion corresponding to the projection of the plate-shaped member 10B so that the end 70b of the operation lever 70 can be lifted and lowered with respect to the lock plate 40B.

Further, the following will describe in detail the embodiment of the present invention.

Figure 16:
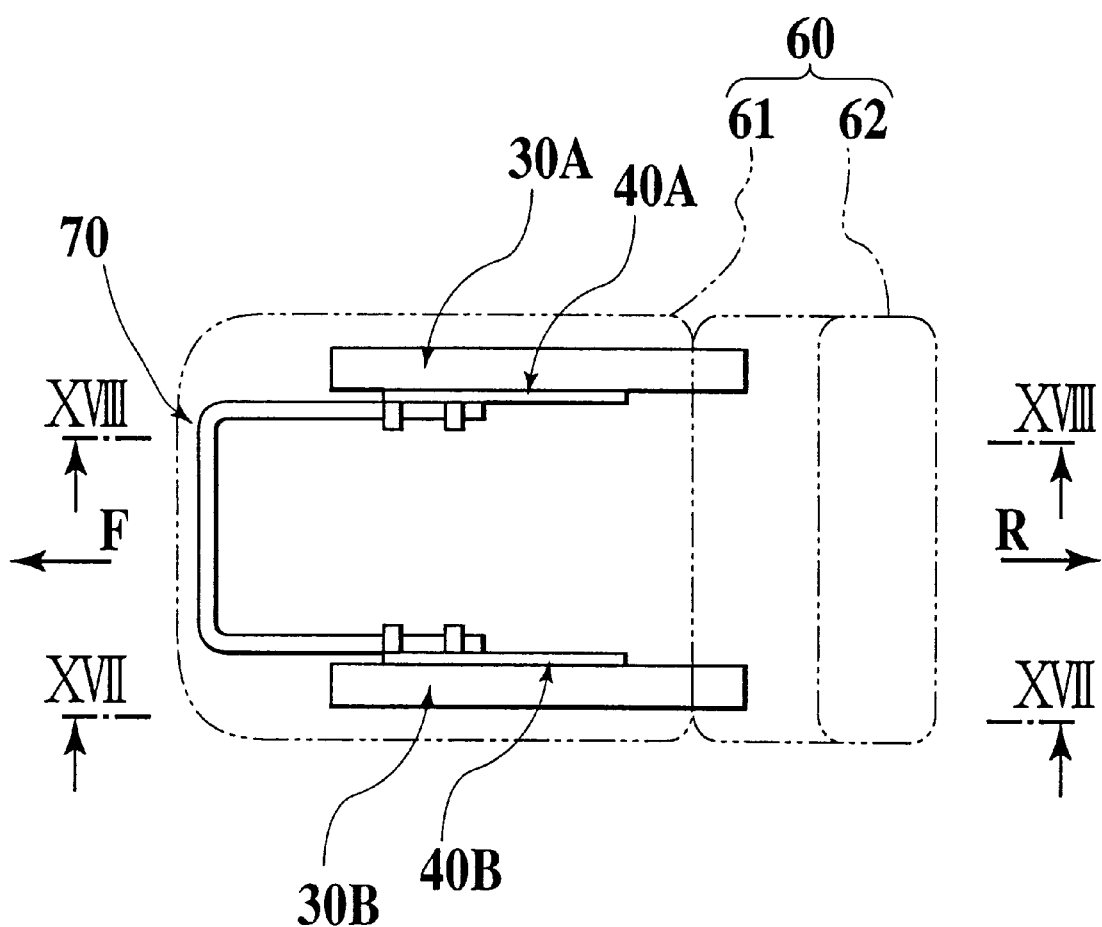
FIG. 16 is a plan explanatory view showing the seat sliding apparatus according to a second embodiment of the present invention.

As shown in FIG. 16, the seat main body 60 has the seat cushion 61 and the seat back 62, and the seat back 62 is mounted to the backward portion of the seat cushion 61 via the shaft so as to be capable of being pivoted by the seat reclining device 63.

Figure 17:
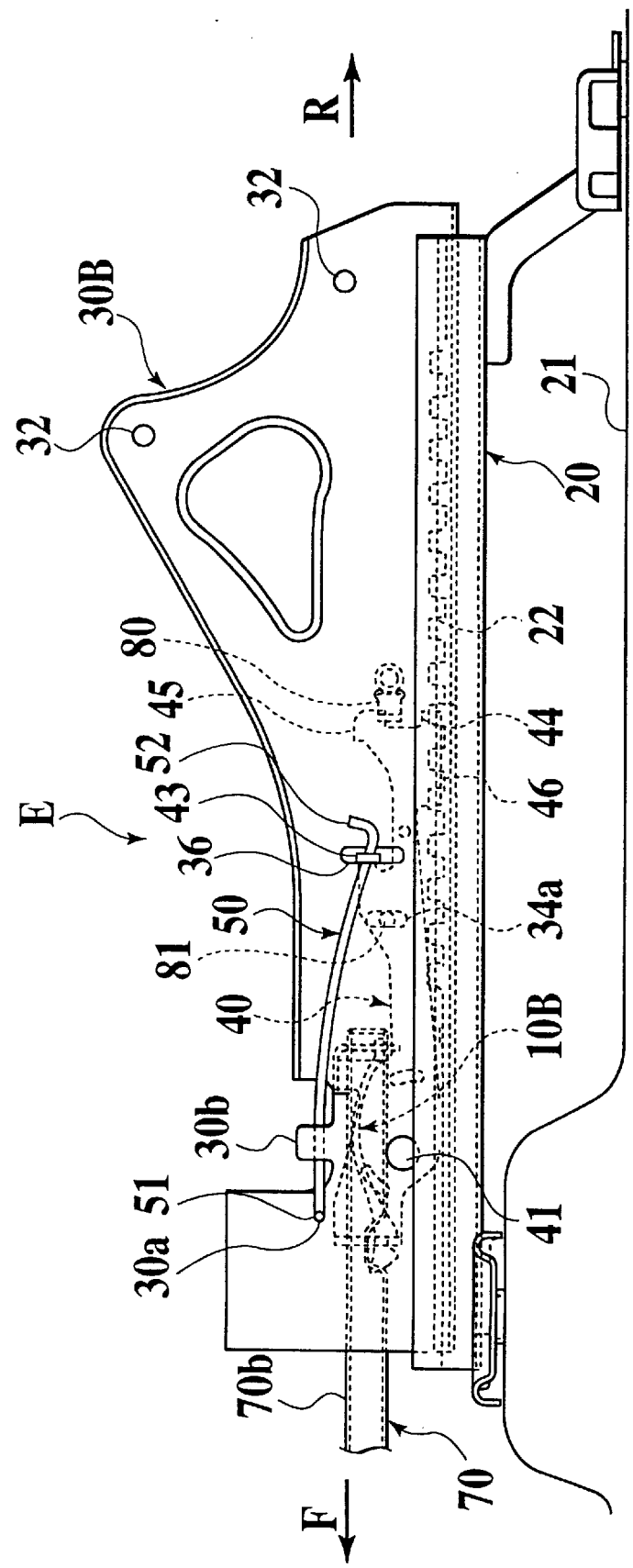
FIG. 17 is a front explanatory view showing the seat sliding apparatus according to the embodiment of the present invention on an opposite side to the belt anchor mounted side, and it is a fragmentary view taken along line XVII—XVII of FIG. 16.
Figure 18:
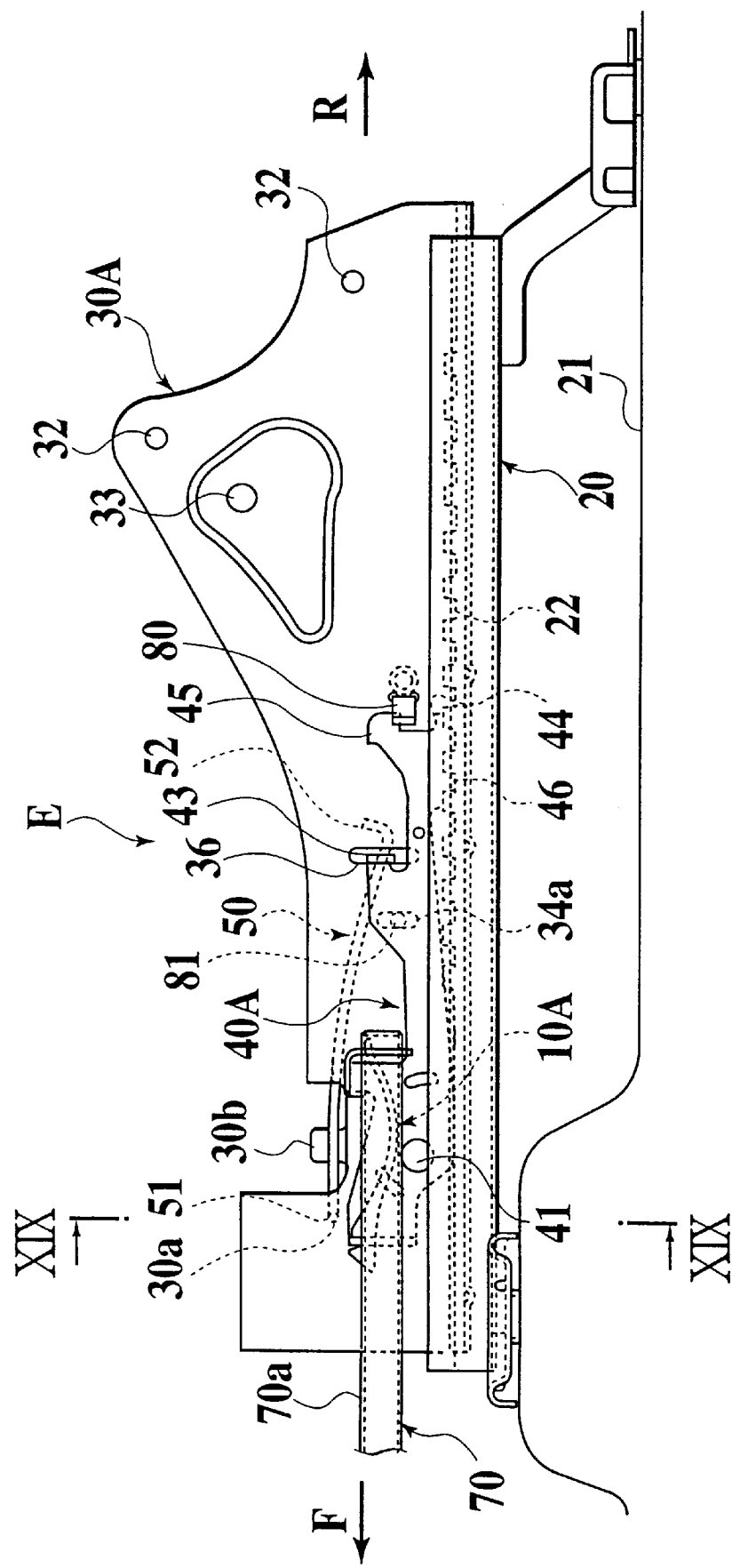
FIG. 18 is a front explanatory view showing the seat sliding apparatus according to the embodiment of the present invention on belt anchor mounted side, and it is a fragmentary view taken along line XVIII—XVIII of FIG. 16.
Figure 19:
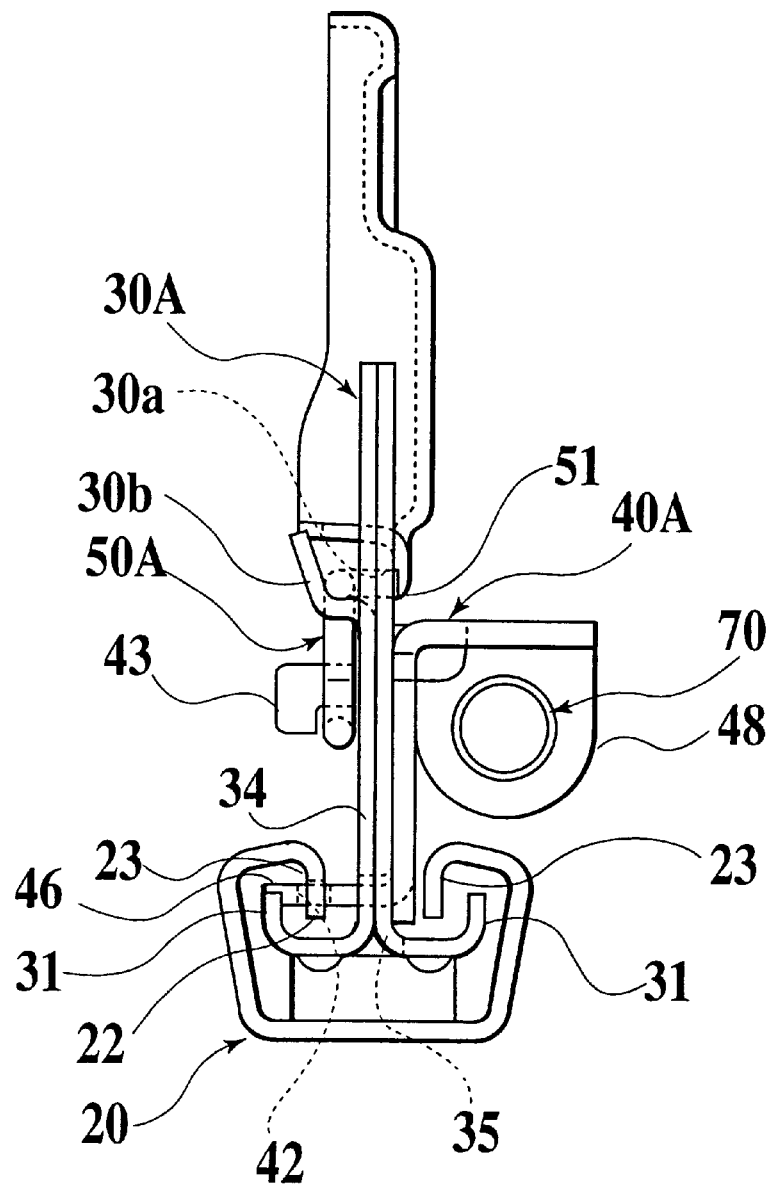
FIG. 19 is a fragmentary explanatory view taken along line XIX—XIX of FIG. 18.
Figure 20:
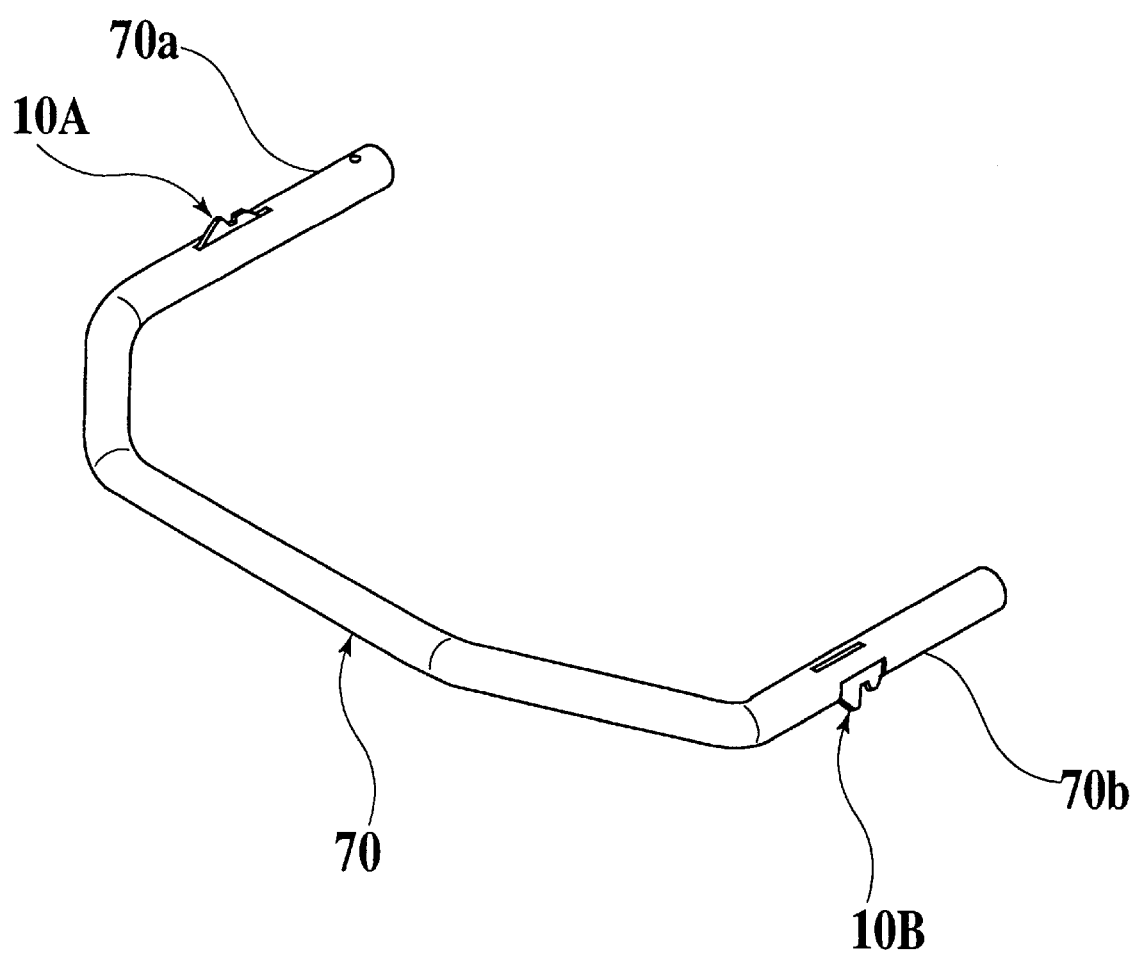
FIG. 20 is a perspective view explaining the operation lever to which the plate-shaped member is mounted.

As shown in FIGS. 16 and 17, the lower rails 20 are mounted to the right and left positions on the car body floor 21 side along the front-and-rear direction at a predetermined distance, and as shown in FIG. 19, they are formed so as to have a substantially U-shaped section, and bent engagement sections 23 are formed inward on both sides. Moreover, the upper rails 30A and 30B are supported to the lower rails 20 so as to be capable of moving along the front-and-rear direction. The upper rails 30A and 30B are formed so as to have a substantially T-shaped section in such a manner that substantially L-shaped plates are overlapped with each other, and the engagement sections 31 are formed upward on their respective sides. Moreover, the seat main body 60 on the seat cushion 61 side is placed on the upper rails 30A and 30B, and as a result the seat main body 60 can be moved in the front-and-rear direction. Further, as shown in FIGS. 17 and 18, the mounting holes 32 for mounting the seat reclining device 63 are formed at the rear portions of the upper rails 30A and 30B, and in the present embodiment, the belt anchor is fixed to the mounting section 33 of the upper rail 30A.

A plurality of the lock gear teeth 22 are formed on one engagement section 23 of the lower rail 20 along the front-and-rear direction at equal intervals. Moreover, the vicinities of the base portions of the lock plates 40A and 40B are mounted to the front sides of the vertical wall sections 34 of the upper rails 30A and 30B by shafts 41 so as to be capable of being pivoted, and the lock plates 40A and 40B are formed symmetrically. A lock section 46 having plural, i.e., two lock holes 42 capable of being engaged with the lock gear teeth 22 of the lower rails 20, is formed on the free ends of the lock plates 40A and 40B, and the lock sections 46 are projected respectively from the notched sections 35 formed on the lower-central sides of the upper rails 30A and 30B to the opposite side so that the lock holes 42 are engaged with the lock gear teeth 22.

In addition, the lock spring engagement sections 43, which are inserted respectively into the arc-shaped lock plate guide slots 36 formed respectively on the upper rails 30A and 30B about the shafts 41, are formed respectively on the free ends of the lock plates 40A and 40B so as to be bent in the opposite direction to that shown in FIG. 5 in the first embodiment. Moreover, the embossed projection 81 is formed on the lock plates 40A and 40B, and the projections 81 are engaged respectively with the grooves 34a formed on one of the vertical wall section 34 of the upper rails 30A and 30B. The grooves 34a regulate the operating range of the lock plates 40A and 40B.

The lock springs 50 are formed into a rod shape, and their respective one ends 51 are inserted into the engagement holes 30a formed on the upper rails 30A and 30B so as to be engaged therewith. While their vicinities are engaged with the hook sections 30b formed on the upper rails 30A and 30B so that the lock springs 50 are not pivoted, the hook sections 52 formed on the other respective ends are engaged with the lock spring engagement sections 43 formed on the lock plates 40A and 40B, and the lock plates 40A and 40B are urged by this lock springs 50 so as to be pivoted about the shafts 41 in the counterclockwise direction, i.e., towards the lockside. Namely, the lock holes 42 of the lock plates 40A and 40B are always pressed against and engaged with the lock gear teeth 22 of the lower rails 20, and as a result the movement of the upper rails 30A and 30B, namely, the seat main body 60 in the front-and-rear direction is obstructed.

The lock plate holding bent section 80 as the lock plate holding means is formed in positions of the upper rails 30A and 30B corresponding to the free ends of the lock plates 40A and 40B by cutting and raising one of the vertical wall section 34 of the upper rails 30A and 30B and bending their forward ends in an opposite direction to that shown in FIGS. 3 and 6 referred in the description of the first embodiment (only the upper rail 30A is shown). The free ends of the lock plates 40A and 40B are held in the lock plate holding bent sections 80 so as to be capable of sliding.

In addition, the notched section 44 through which the lock plate holding bent section 80 can pass is formed at the free ends of the lock plates 40A and 40B in positions corresponding to the lock plate holding bent sections 80. As a result, the lock plates 40A and 40B are mounted to the upper rails 30A and 30B from the sidewise direction by matching the notched sections 44 with the lock plate holding bent sections 80.

In addition, a guide projection 45 is formed on the upper portions of the free ends of the lock plates 40A and 40B. While the lock holes 42 of the lock plates 40A and 40B are pressed against and engaged with the lock gear teeth 22 of the lower rails 20, the guide projections 45 are engaged with the lock plate holding bent sections 80 so as to be projected therefrom. Even if the lock plates 40A and 40B are pivoted downward up to a position where the lock holes 42 of the lock plates 40A and 40B are released from the lock gear teeth 22 of the lower rails 20, the guide projections 45 prevent the free ends of the lock plates 40A and 40B from coming off the lock plate holding bent sections 80.

Further, the operation lever mounting sections 47 and 48 for mounting the operation lever 70 are formed to be bent respectively in the vicinities of the base portions of the lock plates 40A and 40B at a predetermined distance, and the mounting holes 47a and 48a are formed coaxially on the respective operation lever mounting sections 47 and 48. The ends of the operation lever 70 are inserted into the mounting holes 47a and 48a. Then, an edge portion of the mounting hole 47a of the one operation lever mounting section 47 composes the engagement section 49 which can be fitted into the fixing concave section 14 of the plate-shaped member 10.

Figure 26:
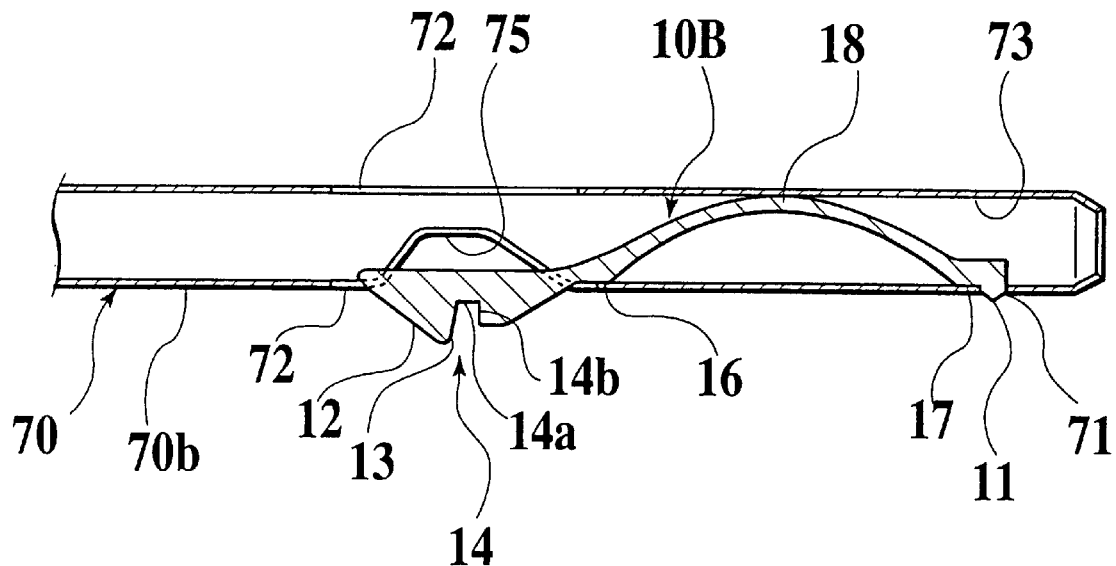
FIG. 26 is a fragmentary sectional view taken along line XXVI—XXVI of FIG. 25.
Figure 27:
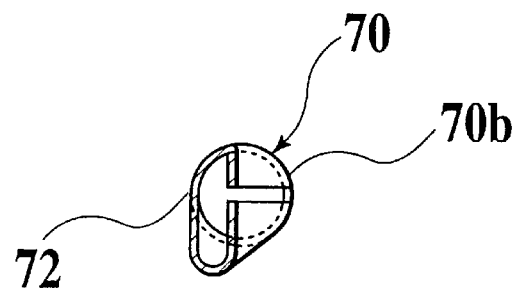
FIG. 27 is a fragmentary sectional view taken along line XXVII—XXVII of FIG. 25.
Figure 28:
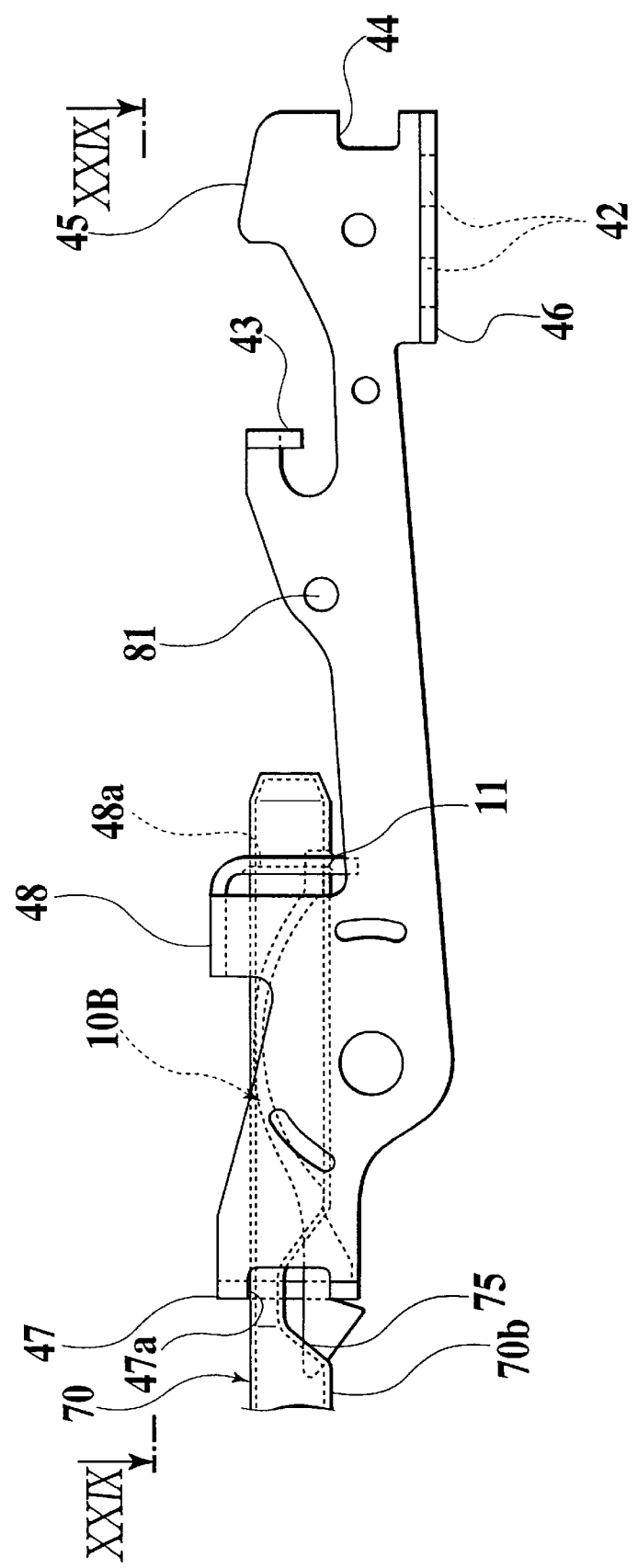
FIG. 28 is a front explanatory view showing a state that the operation lever mounted to the lock plate on the opposite side to the belt anchor mounted side via the plate-shaped member.
Figure 29:
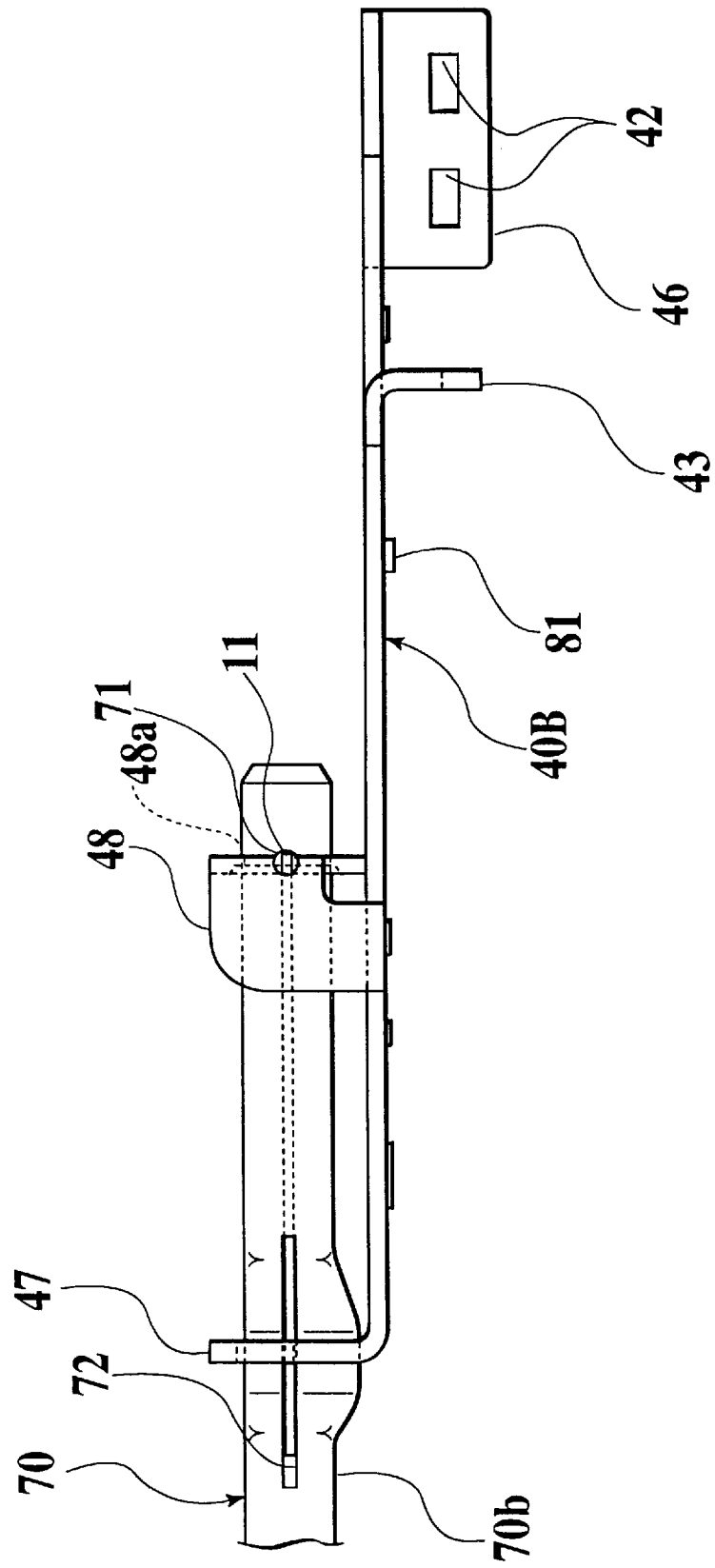
FIG. 29 is a fragmentary explanatory view taken along line XXIX—XXIX of FIG. 28.

The operation lever 70 is formed by a pipe member into a U shape, and like the arrangement of the first embodiment shown in FIG. 13, the engagement hole 71 into which one end 11 of the plate-shaped member 10 can be fitted is formed on the upper surface of the end 70a of the operation lever 70 on the upper rail 30A side. Further, the slit 72 which is extended to the front F side is formed on an axis which passes on the center of the engagement hole 71 with a predetermined separation from the engagement hole 71. The slit 72 is formed so as to be bored through the end 70b of the operation lever 70 on the upper rail 30B side as shown in FIGS. 24 and 26.

The plate-shaped members 10A and 10B are made of thin plate spring materials having the same shape, and they are inserted into the operation lever 70 from the slit 72 of the operation lever 70. The engagement convex section 11, which is fitted into and engaged with the engagement hole 71 of the operation lever 70, is formed at the end of the plate-shaped members 10A and 10B on the insertion side. Moreover, as shown in FIG. 24, the plate-shaped member 10B is inverted 180 with respect to the plate-shaped member 10A so as to be mounted to the end 70B of the operation lever 70 on the opposite side to the belt anchor mounted side.

Figure 24:
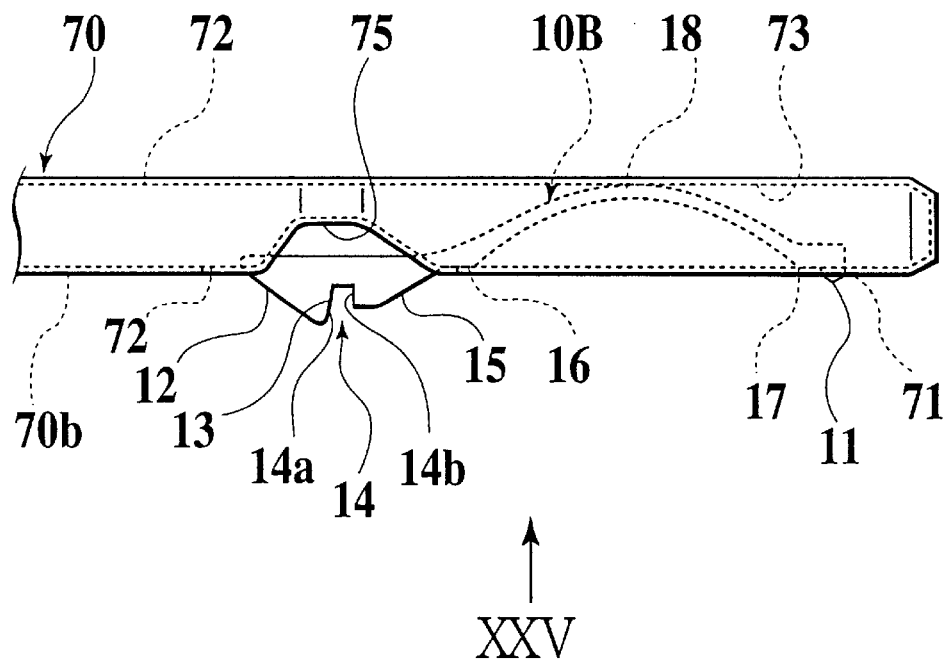
FIG. 24 is a front explanatory view showing a state that the plate-shaped member is mounted to an end of the operation lever on the opposite side to the belt anchor mounted side.
Figure 25:
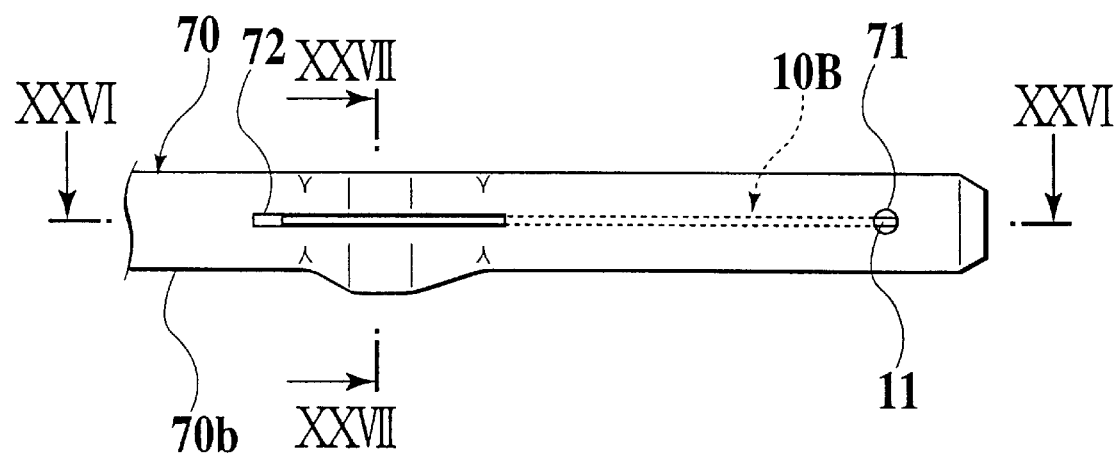
FIG. 25 is a fragmentary explanatory view taken along line XXV—XXV of FIG. 24.

The mounting tapered section 15, the fixing concave section 14 and the returning tapered section 12 are formed at the other respective ends of the plate-shaped members 10A and 10B successively from the direction of the insertion into the mounting holes 47a, and these sections are set so that when the plate-shaped members 10A and 10B are mounted to the operation lever 70, they are projected from the slit 72 outward as shown in FIG. 24. Moreover, as shown in FIG. 24, the notched concave section 75 is formed at the end 70b of the operation lever 70 on the opposite side to the belt anchor mounted side so as to face the projection of the plate-shaped member 10B. The notched concave section 75 is formed in such a manner that the end 70b of the pipe-shaped operation lever 70 is pressed. According to the shape of the notched concave section 75, the operation lever 70 is not removed by being guided by the notched concave section 75 in the left and right direction even when the plate-shaped members 10B is fitted into the operation lever 70. The end 70b has a clearance of the up-and-down direction with respect to the operation lever mounting section 47 of the lock plate 40B due to the notched concave section 75.

The mounting tapered section 15 is a slanted surface which is slanted downward, i.e., towards the rear R side as shown in FIG. 13 with respect to the axis X-X of the operation lever 70 when the plate-shaped member 10A is mounted to the end 70a of the operation lever 70. When the operation lever 70 is inserted into the mounting hole 47a of the lock plate 40A at the time of mounting, the mounting tapered section 15 comes into contact with the edge portion of the mounting hole 47a and thus deflection occurs so that the insertion of the operation lever 70 into the mounting hole 47a is not hindered.

The fixing concave section 14 is formed so that the engagement section 49 of the lock plate 40A can be fitted therein to, and when the bottom section 14a of the fixing concave section 14 is projected from the slit 72 outward, an elastic force is applied to the engagement section 49 so that the end 70a of the operation lever 70 is moved to one side of the mounting hole 47a.

In addition, the side surface 14b of the fixing concave section 14 on the side of the mounting tapered section 15 is formed so as to intersect substantially perpendicularly to the axis X—X of the operation lever 70 when the plate-shaped member 10A is mounted to the end 70a of the operation lever 70. When the operation lever 70 is pulled in the pulling-out direction, it does not easily come off. Moreover, the other side surface 13 of the fixing concave section 14 is disposed with a leaving taper section which is slanted so that its opening side becomes wide, and when a strong force directing to the insertion direction is applied to the operation lever 70, the engagement section 49 of the lock plate 40A leaves from the fixing concave section 14 so that the operation lever 70 is inserted therein to and can be moved to the rear side.

In addition, the returning tapered section 12, which is slanted downward, is formed on the opposite side to the mounting tapered section 15 across the fixing concave section 14. Even if the operation lever 70 is inserted mistakenly, the plate-shaped member 10A is deflected by pulling out the operation lever 70, and the fixing concave section 14 can be again engaged with the engagement section 49 of the lock plate 40A.

In addition, when the operation lever 70 is mounted to the regular position of the lock plate 40A, namely, when the engagement section 49 of the lock plate 40A is fitted into the fixing concave section 14 of the plate-shaped member 10A, the engagement hole 71 of the operation lever 70 overlaps with the operation lever mounting section 48 of the lock plate 40A. Since the engagement convex section 11 of the plate-shaped member 10A which is projected from the engagement hole 71 comes in contact with the inner surface of the mounting hole 48a of the operation lever mounting section 48 so that an elastic force is applied, the operation lever 70 is moved to one side of the mounting hole 48a. The engagement convex section 11 is formed into an angular shape, but it may have an arc shape or a tapered shape.

The above-mentioned relationship between the plate-shaped member 10A, the lock plate 40A and the end 70a of the operation lever 70 is the same as the relationship between the plate-shaped member 10B, the lock plate 40B and the end 70b of the operation lever 70, so the description thereof is omitted.

The following will describe an embodiment of the present invention.

When the lock plates 40A and 40B are mounted to the upper rails 30A and 30B, the notched sections 44 of the lock plates 40A and 40B are first inserted into the lock plate holding bent sections 80, and simultaneously the lock spring engagement sections 43 are inserted into the lock plate guide slots 36. At this time, the lock sections 46 of the lock plates 40A and 40B are projected from the notched sections 35 of the upper rails 30A and 30B to the opposite side. Next, the base portions of the lock plates 40A and 40B are supported respectively to the upper rails 30A and 30B by the shafts 41. As a result, the lock plates 40A and 40B can be mounted to the upper rails 30A and 30B via the shafts so as to be capable of being pivoted.

Next, the upper rails 30A and 30B are mounted to the lower rails 20 via rollers, balls or the like so as to be capable of sliding. As a result, even if the lock plates 40A and 40B are pivoted up to a position where the lock holes 42 of the lock plates 40A and 40B are engaged with the lock gear teeth 22 of the lower rails 20, the lock plates 40A and 40B are not pivoted up to a position where the notched sections 44 coincide with the lock plate guide bent sections 80.

Then, the one ends 51 are inserted into the engagement hole 30a of the upper rails 30A and 30B, and simultaneously the lock springs 50 in which the vicinities of the ends 51 are engaged with the hook sections 30b are deflected, and the hook sections 52 at the other ends of the lock springs 50 are engaged with the lock spring engagement sections 43 of the lock plates 40A and 40B which are projected from the lock plate guide slots 36 of the upper rails 30A and 30B. As a result, the lock sections 46 of the lock plates 40A and 40B are urged in the counterclockwise direction in the drawing, namely, in a direction where the lock holes 42 of the lock plates 40A and 40B are pressed against and engaged with the lock gear teeth 22 of the lower rails 20.

In order to mount the operation lever 70 to the lock plates 40A and 40B, as shown in FIGS. 13 and 24, the plate-shaped members 10A and 10B are first deflected so as to be inserted into the operation lever 70 from the slits 72, and the engagement convex sections 11 are fitted into the engagement holes 71 of the operation lever 70 from the inside. At the same time, the flat sections 16 and 17 are pressingly brought into contact with an inner surface 73 of the operation lever 70. At this time, the arc sections 18 of the plate-shaped members 10A and 10B are pressingly brought into contact with the inner surface 73 of the operation lever 70.

Figure 21:
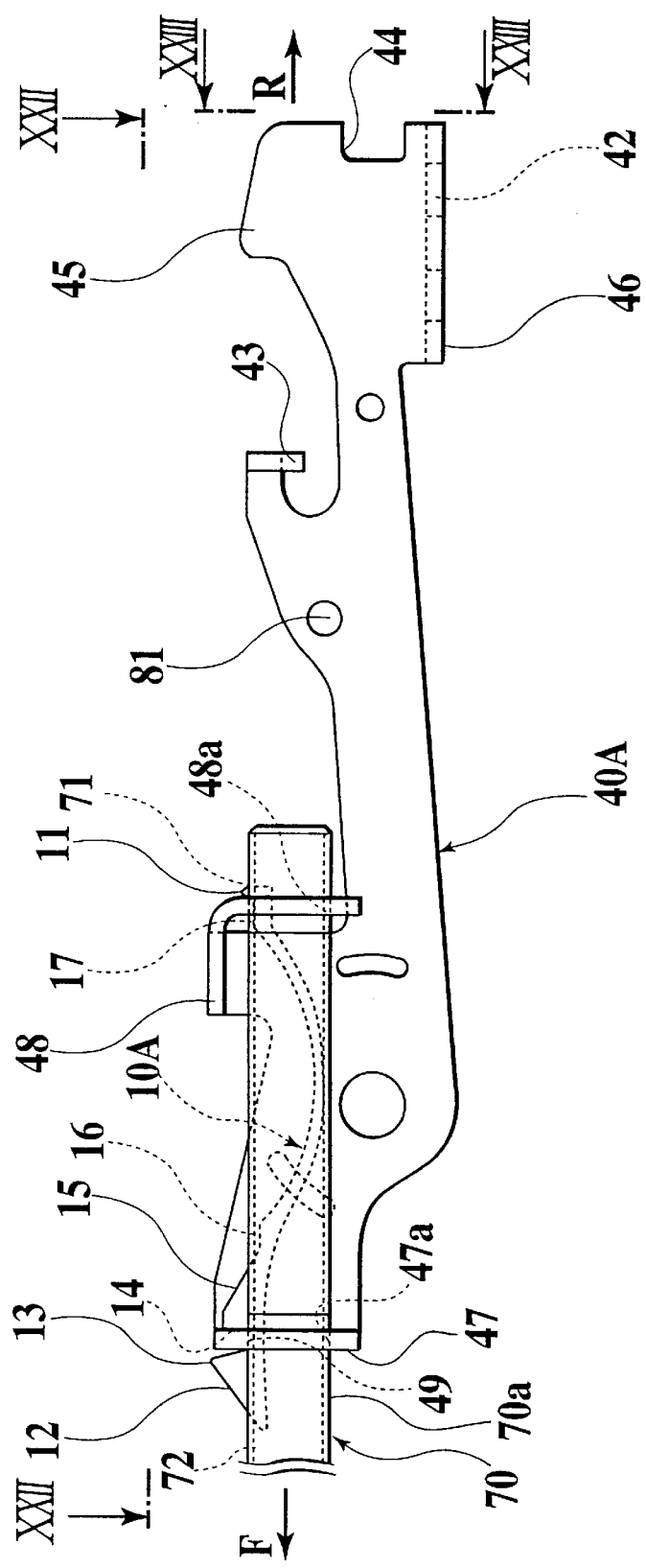
FIG. 21 is a front explanatory view showing a state that the operation lever is mounted to the lock plate on the belt anchor mounted side via the plate-shaped member.
Figure 22:
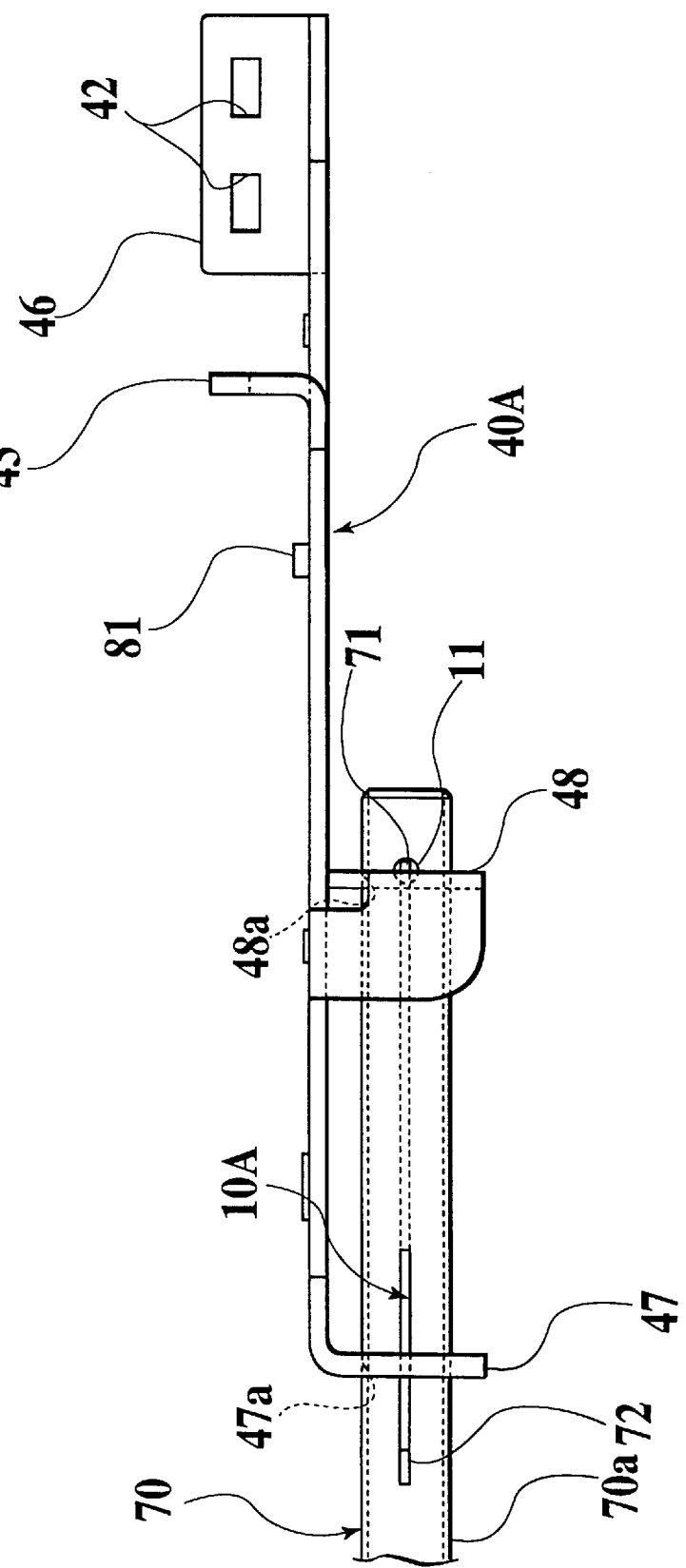
FIG. 22 is a fragmentary explanatory view taken along line XXII—XXII of FIG. 21.
Figure 23:
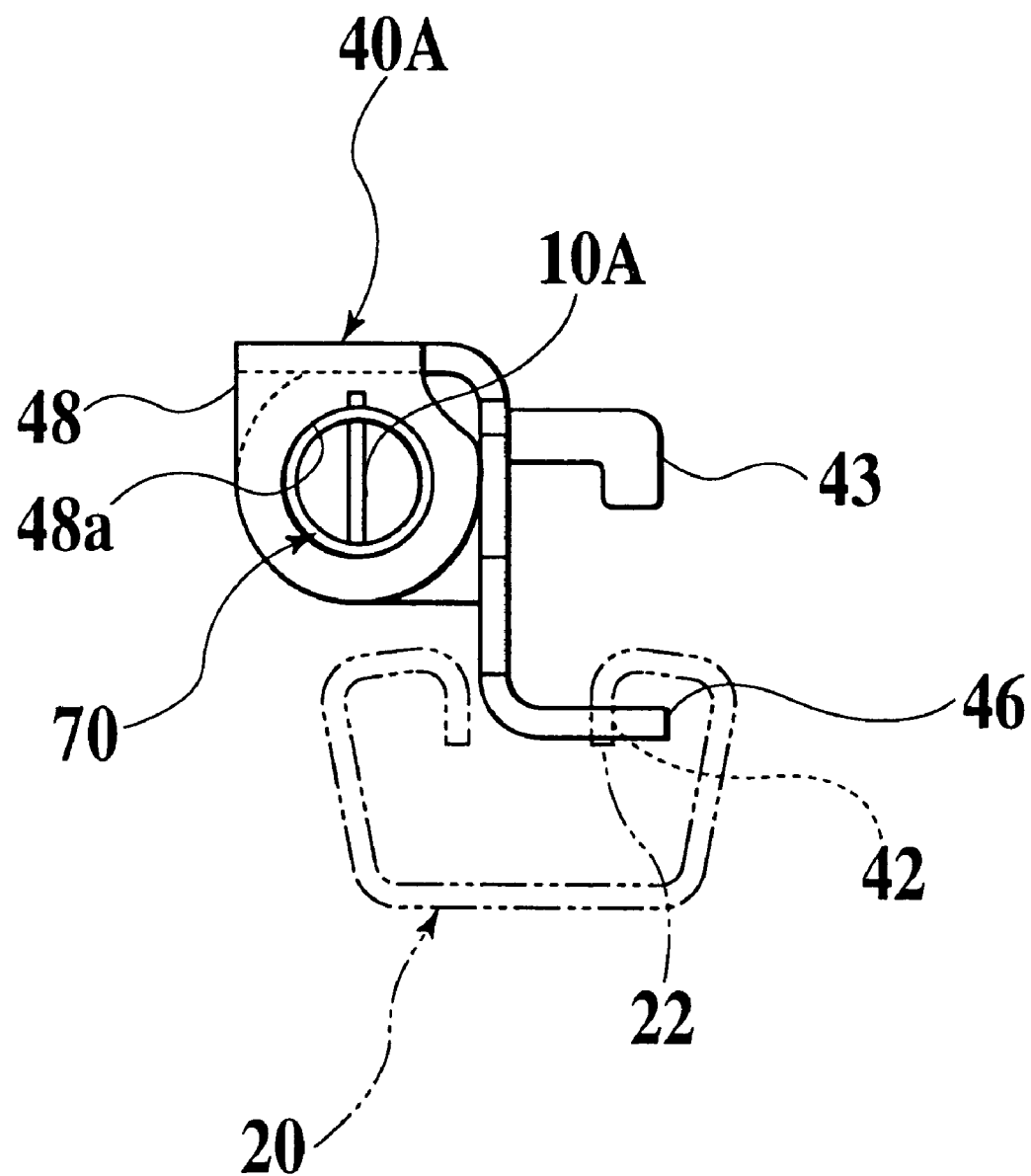
FIG. 23 is a fragmentary explanatory view taken along line XXIII—XXIII of FIG. 21.

Next, similarly to the function described in the first embodiment with reference to FIG. 14, the end 70a of the operation lever 70 to which the plate-shaped member 10A was mounted is inserted into the mounting hole 47a of the operation lever mounting section 47 of the lock plate 40A. Then, the engagement section 49 of the lock plate 40A slides on the mounting tapered section 15, and the plate-shaped member 10A on the front F side is deflected about a contact portion of the arc section 18 with the inner surface 73 so that the plate-shaped member 10A is temporarily evacuated in the slit 72. When the fixing concave section 14 reaches a position which face the engagement section 49, the engagement section 49 is fitted into the fixing concave section 14 by the elastic force of the plate-shaped member 10A. As a result, as shown in FIG. 21, the end 70a of the operation lever 70 can be mounted to the lock plate 40A.

This mounting means is the same as that in the case where the end 70b of the operation lever 70, to which the plate-shaped member 10B was mounted, is mounted to the lock plate 40B, so the description thereof is omitted.

Then, when the operation lever 70 is pivoted upward, the lock plates 40A and 40B are pivoted about the shaft 41 in the clockwise direction, and the lock holes 42 leave from the lock gear teeth 22 of the lower rails 20 so that the seat main body 60 can be moved in the front-and-rear direction.

Here, the clearance in the up-and-down direction is provided between the mounting hole 47a of the lock plate 40B on the opposite side to the belt anchor side and the end of the operation lever 70 by the notched concave section 75, but since the fixing concave section 14 of the plate-shaped member 10B applies the elastic force to the engagement section 49, the unstable state is not obtained. When the lock of the operation lever 70 is released, the influence of the clearance is not exerted on the operation lever 70. As a result, the operation feeling is satisfactory.

In addition, when a not less than constant force is applied to the operation lever 70 from the front F side, the engagement sections 49 of the lock plate 40A and 40B slide on the leaving tapered section 13 and the plate-shaped members 10A and 10B on the front F side are evacuated in the slits 72 so that the operation lever 70 is moved to the rear R side.

Then, when an abnormal force is applied to the operation lever 70 from the front F side and if the operation lever 70 exceeds the regular mounting position so as to enter the lock plate 40A similarly to the function described in the first embodiment with reference to FIG. 15, the operation lever 70 is pulled back so as to be moved to the front F side. As a result, the engagement section 49 of the lock plate 40A slides on the returning tapered section 12, and the plate-shaped member 10A on the front F side is temporarily evacuated in the slit 72. When the fixing concave section 14 reaches the position which face the engagement section 49, the engagement section 49 is fitted into the fixing concave section 14 by the elastic force of the plate-shaped member 10A. As a result, the operation lever 70 can be returned to the regular mounting position. This relationship is the same as that between the plate-shaped member 10B and the lock plate 40B.

Figure 30:
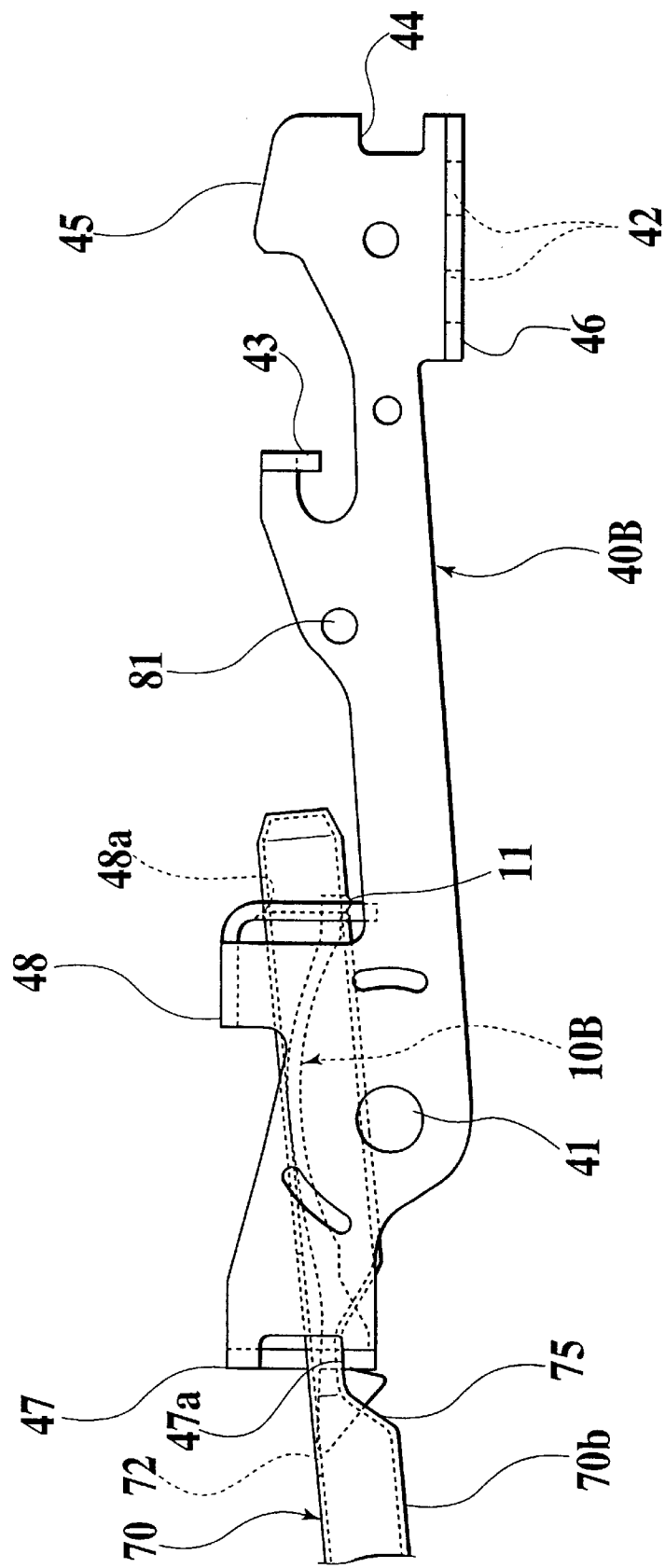
FIG. 30 is an explanatory drawing showing an operation of stress absorption means.

In addition, in the case where an abnormal situation such as a collision arises, a stress is applied to the upper rail 30A on the belt anchor mounted side, and as a result the upper rail 30A is pulled upward together with the lock plate 40A. At this time, the end 70a of the operation lever 70 on the belt anchor mounted side is also moved upward, but the end 70b of the operation lever on the opposite side to the belt anchor mounted side moves downward about the mounting hole 48a of the mounting section 48 against a spring force of the plate-shaped member 10B within a range where the bottom surface of the notched concave section 75 contacts with the engagement section 47a of the mounting section 47 of the lock plate 40B as shown in FIG. 30.

In such a manner, since the end 70b of the operation lever, which is mounted to the lock plate 40B positioned on the upper rail 30B on the opposite side to the belt anchor mounted side, can be move downward by the notched concave section 75 as the phase angle absorption means, even if a stress is applied to the upper rail 30A on the belt anchor mounted side due to a collision or the like, the stress is not transmitted to the lock plate 40B on the opposite side to the belt anchor mounted side. Therefore, the lock plate 40A on the belt anchor mounted side and the operation lever 70 can be moved according to the deformation of the upper rail 30A on the belt anchor mounted side.

As a result, since the operation lever 70 is not pried, when a force, which is extended in the front F direction, fails after the collision, the lock plate 40A on the belt anchor mounted side is not pivoted in the lock releasing direction. As a result, the engagement state between the lock holes 42 of the lock plate 40A and the lock gear teeth 22 of the lower rail 20 can be maintained.

As mentioned above, according to the embodiment of the present invention, since the end 70b of the operation lever 70, which is mounted to the lock plate 40B positioned on the upper rail 30B on the opposite side to the belt anchor mounted side, can be moved to the lock direction by the notched concave section 75 as the phase angle absorption means, even if a stress is applied to the upper rail 30A on the belt anchor mounted side due to the collision or the like, the stress is not transmitted to the lock plate 40B on the opposite side to the belt anchor mounted side so that the operation lever 70 is not pried. As a result, the lock releasing on the belt anchor side can be prevented.

In addition, since the plate-shaped members 10A and 10B can be mounted to the operation lever 70 by inserting the engagement convex sections 11 into the engagement holes 71 from the inside through the slits 72 so as to be fitted therein to, the structure of mounting the operation lever 70 to the lock plate 40 can be simplified.

In addition, the operation for mounting the operation lever 70 to the lock plates 40A and 40B can be further simplified by co-operation of the mounting tapered sections 15 of the plate-shaped members 10A and 10B and the engagement sections 49 of the lock plates 40A and 40B.

In addition, since the fixing concave sections 14 of the plate-shaped members 10A and 10B are formed so that the engagement sections 49 of the lock plates 40A and 40B can be fitted therein to, the operation lever 70 can be accurately located on the lock plates 40A and 40B.

In addition, when a not less than constant force is applied from the front F side to the operation lever 70 by the leaving tapered sections 13 formed respectively on the plate-shaped members 10A and 10B, the operation lever 70 is moved to the rear R side. As a result, since a force directing to the lock releasing direction is not applied to the lock plates 40A and 40B, inadvertent lock release can be prevented.

In addition, even if an abnormal situation arises, i.e., the operation lever 70 exceeds the regular mounting position so as to be mounted to the lock plates 40A and 40B, the operation lever 70 can be returned to the regular mounting position by the returning tapered sections 12 formed on the plate-shaped members 10A and 10B.

Furthermore, since the operation lever 70 can be mounted to the lock plates 40A and 40B stably by the plate-shaped members 10A and 10B which is formed into a bow shape and to which an elastic force is applied, occurrence of noises can be prevented, and simultaneously operation feeling can be improved.

Further, the engagement of the fixing concave sections 14 of the plate-shaped members 10A and 10B with the engagement sections 49 of the lock plates 40A and 40B regulates the axial movement of the operation lever 70 and does not regulate the rotating direction, and the operation lever 70 has a circular section. As a result, even if the vertical wall sections 34 of the upper rails 30A and 30B fall at the time of a side-on collision, the operation lever 70 is not pried, and the pivoting of the lock plates 40A and 40B in the lock releasing direction due to the prying can be prevented. For this reason, inadvertent lock release can be prevented.

Here, in the present embodiment, the clearance in the up-and-down direction is provided by the notched section 75, but the clearance may be provided by widening the mounting hole 47a. Moreover, the fixing concave sections 14 of the plate-shaped members 10A and 10B are engaged with the edges of the mounting holes 47a of the mounting sections 47, but they may be engaged with the edges of the mounting holes 48a of the mounting sections 48.

While preferred embodiments of the present invention have been described using specific terms, such description is for illustrative purposes, and it is to be understood that changes and variations may be made without departing from the spirit or scope of the following claims.

What is claimed is:

1. A seat sliding apparatus comprising:
   a pair of right and left upper rails to be slidably guided in a pair of right and left lower rails, the upper rails being provided with a seat main body;
   a pair of lock plates mounted respectively to the pair of right and left upper rails in such a manner such that vicinities of base portions of the lock plates are pivoted via a shaft so that the lock plates are capable of swinging around the shaft;
   lock holes formed on a lower portion of a free end of the lock plates to engage with lock gear teeth formed on the pair of right and left lower rails;
   a lock spring biasing the lock plates to swing so that the lock holes are engaged with lock gear teeth, whereby a movement of the seat main body in a front-and-rear direction is prevented, and whereby the seat main body can be moved in the front-and-rear direction by releasing the engagement;
   an operation lever mounted to the pair of lock plates so that the lock plates can be operated simultaneously by operating the operation lever, wherein
   the operation lever is formed into a substantially U shape and each end of the operation lever is connected with the lock plate mounted to the upper rail on a belt anchor mounted side and with the other lock plate mounted to the other upper rail on an opposite side to the belt anchor mounted side;
   the operation lever at an end of the opposite side to the belt anchor mounted side is provided with a phase angle absorption means;
   the lock plates have two operation lever mounting sections which are coaxially formed with mounting holes respectively;
   the ends of the operation lever made of a pipe member are inserted into the two mounting holes;
   a plate-shaped member made of a spring material, which is formed into a substantially bow shape viewed from the front, is inserted into the pipe of the operation lever in the longitudinal direction in a manner such that an elastic force is applied to the plate-shaped material;
   ends of the plate-shaped member are engaged with two holes arranged on the ends of the operation lever in the longitudinal direction;
   said one hole formed on the operation lever is a slit in the longitudinal direction;
   one portion of the plate-shaped member is projected outward;
   a fixing concave section, which is engaged with an engagement section of the operation lever mounting sections, is formed on one portion of the projected plate-shaped member;
   a mounting tapered section is formed on the plate-shaped member which is slanted to an insertion direction where the fixing concave section is inserted into the mounting hole;
   a clearance in an u-and-down direction is provided between the mounting holes of the lock plates and the ends of the operation lever; and
   the fixing concave section of the plate-shaped member projected from the operation lever is positioned so that its bottom section is in an outer side from an outer peripheral surface of the operation lever so that an elastic force is applied to the engagement sections of the operation lever mounting sections.

2. A seat sliding apparatus according to claim 1, wherein the plate-shaped member on the opposite side to the belt anchor mounted side is formed so that its one end on which the fixing concave section is formed is projected to the lock side; and
a notched concave section is provided on a portion of the end of the operation lever on the opposite side to the belt anchor mounted side corresponding to the projected section of the plate-shaped member.

3. A seat sliding apparatus according to claim 1, wherein the fixing concave section on the side of insertion into the mounting holes is formed so as to intersect substantially perpendicularly to an axis of the operation lever; and the fixing concave section on the other side is slanted so that its open side becomes wider and a leaving tapered section is formed thereon.

4. A seat sliding apparatus according to claim 1, wherein a returning tapered section, which is slanted downward, is formed on the plate-shaped member on a side opposite to the mounting tapered section across the fixing concave section.

5. A seat sliding apparatus, comprising:

a pair of right and left upper rails to be slidably guided in a pair of right and left lower rails, the upper rails being provided with a seat main body;

a pair of lock plates mounted respectively to the pair of right and left upper rails in such a manner that vicinities of base portions of the lock plates are pivoted via a shaft so that the lock plates are capable of swinging around the shaft;

lock holes formed on a lower portion of a free end of the lock plates to engage with lock gear teeth formed on the pair of right and left lower rails;

a lock spring biasing the lock plates to swing so that the lock holes are engaged with lock gear teeth, thereby a movement of the seat main body in a front-and-rear direction is prevented, and whereby the seat main body can be moved in the front-and-rear direction by releasing the engagement; and an operation lever mounted to the pair of lock plates so that the lock plates can be operated simultaneously by operating the operation lever, wherein the lock plates have two operation lever mounting sections which are coaxially formed with mounting holes respectively;

the ends of the operation lever made of a pipe member are inserted into the two mounting holes;

a plate-shaped member made of a spring material, which is formed into a substantially bow shape viewed from the front, is inserted into the pipe of the operation lever in the longitudinal direction in a manner such that an elastic force is applied to the plate-shaped material;

ends of the plate-shaped member are engaged with two holes arranged on the ends of the operation lever in the longitudinal direction;

said one hole formed on the operation lever is a slit in the longitudinal direction;

one portion of the plate-shaped member is projected outward;

a fixing concave section, which is engaged with an engagement section of the operation lever mounting sections, is formed on one portion of the projected plate-shaped member; and a mounting tapered section is formed on the plate-shaped member which is slanted to an insertion direction where the fixing concave section is inserted into the mounting hole.

6. A seat sliding apparatus according to claim 5, wherein the fixing concave section of the plate-shaped member projected from the operation lever is positioned so that its bottom section is in an outer side from an outer peripheral surface of the operation lever so that an elastic force is applied to the engagement sections of the operation lever mounting sections.

7. A seat sliding apparatus according to claim 6, wherein the fixing concave section has a bottom section, a first side surface and a second side surface;

the first side surface is slanted at a substantial right angle with the axis of the operation lever; and the second side surface is slanted in such a manner that the plate-shaped member can be easily ejected through the engagement section of the operation lever section.

8. A seat sliding apparatus according to claim 7, wherein the plate-shaped member is formed with a returning tapered section on a opposite side to the mounting tapered section of the fixing concave section; and the returning tapered section is slanted in a direction opposite to a slanting direction of the mounting tapered section.

9. A seat sliding apparatus according to claim 7, wherein another portion of the plate-shaped member is formed at the other end of the plate-shaped member other than said one portion of the plate-shaped member;

the other portion of the plate-shaped member is projected from the operation lever through the other hole formed in the operation lever so that an elastic force is applied to the engagement sections of the operation lever mounting sections by the other portion.

* * * * *